(12) United States Patent  
Nguyen et al.

(10) Patent No.: US 9,268,103 B2
(45) Date of Patent: Feb. 23, 2016

(54) INTERLOCKABLE FIBER OPTIC CONNECTOR ADAPTORS

(71) Applicants: SENKO Advanced Components, Inc., Marlboro, MA (US); AMPHENOL Fiber Optic Technology(Shenzhen)Co., Ltd., Shenzhen (CN)

(72) Inventors: Anh Ngoc Nguyen, Carrollton, TX (US); Kazu Takano, Marlboro, MA (US); Jeffrey Gniadek, Northbridge, MA (US); Jiang Bolin, Shenzhen (CN); Min Chen, Shenzhen (CN)

(73) Assignee: SENKO ADVANCED COMPONENTS, INC., Marlborough, MA (US)

( * ) Notice: Subject to any disclaimer, the term of this patent is extended or adjusted under 35 U.S.C. 154(b) by 384 days.

(21) Appl. No.: 13/891,191

(22) Filed: May 10, 2013

(65) Prior Publication Data
US 2014/0334780 A1 Nov. 13, 2014

(51) Int. Cl.
*G02B 6/38* (2006.01)

(52) U.S. Cl.
CPC ............ *G02B 6/3897* (2013.01); *G02B 6/3825* (2013.01)

(58) Field of Classification Search
None
See application file for complete search history.

(56) References Cited

U.S. PATENT DOCUMENTS

| | | |
|---|---|---|
| 4,150,790 A | 4/1979 | Potter |
| 4,327,964 A | 5/1982 | Haesly et al. |
| 4,762,388 A | 8/1988 | Tanaka et al. |
| 4,764,129 A | 8/1988 | Jones et al. |
| 4,840,451 A | 6/1989 | Sampson et al. |
| 4,872,736 A | 10/1989 | Myers et al. |
| D323,143 S | 1/1992 | Ohkura et al. |
| 5,212,752 A | 5/1993 | Stephenson et al. |
| 5,317,663 A | 5/1994 | Beard et al. |
| 5,348,487 A | 9/1994 | Marazzi et al. |
| 5,444,806 A | 8/1995 | deMarchi et al. |
| 5,481,634 A | 1/1996 | Anderson et al. |
| 5,506,922 A | 4/1996 | Grois et al. |
| 5,570,445 A | 10/1996 | Chou et al. |
| 5,588,079 A | 12/1996 | Tanabe et al. |
| 5,684,903 A | 11/1997 | Kyomasu et al. |
| 5,687,268 A | 11/1997 | Stephenson et al. |
| 5,781,681 A | 7/1998 | Manning |
| 5,937,130 A | 8/1999 | Amberg et al. |
| 5,956,444 A | 9/1999 | Duda et al. |
| 5,971,626 A | 10/1999 | Knodell et al. |

(Continued)

FOREIGN PATENT DOCUMENTS

| | | |
|---|---|---|
| CA | 2495693 A1 | 4/2004 |
| CN | 2836038 Y | 11/2006 |

(Continued)

OTHER PUBLICATIONS

European Search Report and Written Opinion dated Mar. 3, 2015 for EP 14187661.

(Continued)

*Primary Examiner* — Tina Wong
(74) *Attorney, Agent, or Firm* — Pepper Hamilton LLP

(57) ABSTRACT

Adaptors for providing a connection between fiber-optic cables may be configured to be interlocked in both side-by-side and top-to-bottom orientations with adjacent adaptors to eliminate wasted spaced between adjacent rows and/or columns of adaptors in a junction panel.

8 Claims, 10 Drawing Sheets

(56) References Cited

U.S. PATENT DOCUMENTS

| | | |
|---|---|---|
| 6,041,155 A | 3/2000 | Anderson et al. |
| 6,049,040 A | 4/2000 | Biles et al. |
| 6,134,370 A | 10/2000 | Childers et al. |
| 6,178,283 B1 | 1/2001 | Weigel |
| RE37,080 E | 3/2001 | Stephenson et al. |
| 6,206,577 B1 | 3/2001 | Hall, III et al. |
| 6,206,581 B1 | 3/2001 | Driscoll et al. |
| 6,227,717 B1 | 5/2001 | Ott et al. |
| 6,238,104 B1 | 5/2001 | Yamakawa et al. |
| 6,247,849 B1 | 6/2001 | Liu |
| 6,461,054 B1 | 10/2002 | Iwase |
| 6,471,412 B1 | 10/2002 | Belenkiy et al. |
| 6,478,472 B1 | 11/2002 | Anderson et al. |
| 6,551,117 B2 | 4/2003 | Poplawski et al. |
| 6,579,014 B2 | 6/2003 | Melton et al. |
| 6,634,801 B1 | 10/2003 | Waldron et al. |
| 6,648,520 B2 | 11/2003 | McDonald et al. |
| 6,682,228 B2 | 1/2004 | Rathnam et al. |
| 6,685,362 B2 | 2/2004 | Burkholder et al. |
| 6,695,486 B1 | 2/2004 | Falkenberg |
| 6,854,894 B1 | 2/2005 | Yunker et al. |
| 6,872,039 B2 | 3/2005 | Baus et al. |
| 6,935,789 B2 | 8/2005 | Gross, III et al. |
| 7,090,406 B2 | 8/2006 | Melton et al. |
| 7,090,407 B2 | 8/2006 | Melton et al. |
| 7,091,421 B2 | 8/2006 | Kukita et al. |
| 7,111,990 B2 | 9/2006 | Melton et al. |
| 7,113,679 B2 | 9/2006 | Melton et al. |
| D533,504 S | 12/2006 | Lee |
| D534,124 S | 12/2006 | Taguchi |
| 7,150,567 B1 | 12/2006 | Luther et al. |
| 7,153,041 B2 | 12/2006 | Mine et al. |
| 7,198,409 B2 | 4/2007 | Smith et al. |
| 7,207,724 B2 | 4/2007 | Gurreri |
| D543,146 S | 5/2007 | Chen et al. |
| 7,258,493 B2 | 8/2007 | Milette |
| 7,281,859 B2 | 10/2007 | Mudd et al. |
| D558,675 S | 1/2008 | Chien et al. |
| 7,315,682 B1 | 1/2008 | En Lin et al. |
| 7,325,976 B2 | 2/2008 | Gurreri et al. |
| 7,325,980 B2 | 2/2008 | Pepe |
| 7,329,137 B2 | 2/2008 | Martin et al. |
| 7,331,718 B2 | 2/2008 | Yazaki et al. |
| 7,354,291 B2 | 4/2008 | Caveney et al. |
| 7,371,082 B2 | 5/2008 | Zimmel et al. |
| 7,387,447 B2 | 6/2008 | Mudd et al. |
| 7,390,203 B2 | 6/2008 | Murano et al. |
| D572,661 S | 7/2008 | En Lin et al. |
| 7,431,604 B2 | 10/2008 | Waters et al. |
| 7,463,803 B2 | 12/2008 | Cody et al. |
| 7,465,180 B2 | 12/2008 | Kusuda et al. |
| 7,510,335 B1 | 3/2009 | Su et al. |
| 7,513,695 B1 | 4/2009 | Lin et al. |
| 7,561,775 B2 | 7/2009 | Lin et al. |
| 7,591,595 B2 | 9/2009 | Lu et al. |
| 7,594,766 B1 | 9/2009 | Sasser et al. |
| 7,641,398 B2 | 1/2010 | O'Riorden et al. |
| 7,695,199 B2 | 4/2010 | Teo et al. |
| 7,699,533 B2 | 4/2010 | Milette |
| 7,824,113 B2 | 11/2010 | Wong et al. |
| 7,837,395 B2 | 11/2010 | Lin et al. |
| D641,708 S | 7/2011 | Yamauchi |
| 8,186,890 B2 | 5/2012 | Lu |
| 8,192,091 B2 | 6/2012 | Hsu et al. |
| 8,202,009 B2 | 6/2012 | Lin et al. |
| 8,251,733 B2 | 8/2012 | Wu |
| 8,267,595 B2 | 9/2012 | Lin et al. |
| 8,270,796 B2 | 9/2012 | Nhep |
| 8,408,815 B2 | 4/2013 | Lin et al. |
| 8,465,317 B2 | 6/2013 | Gniadek et al. |
| 8,651,749 B2 | 2/2014 | Dainese Junior et al. |
| 2003/0053787 A1 | 3/2003 | Lee |
| 2004/0052473 A1 | 3/2004 | Seo et al. |
| 2004/0136657 A1 | 7/2004 | Ngo |
| 2004/0141693 A1 | 7/2004 | Szilagyi et al. |
| 2004/0161958 A1 | 8/2004 | Togami et al. |
| 2004/0234209 A1 | 11/2004 | Cox et al. |
| 2005/0111796 A1 | 5/2005 | Matasek et al. |
| 2005/0141817 A1 | 6/2005 | Yazaki et al. |
| 2006/0089049 A1 | 4/2006 | Sedor |
| 2006/0127025 A1 | 6/2006 | Haberman |
| 2006/0269194 A1 | 11/2006 | Luther et al. |
| 2006/0274411 A1 | 12/2006 | Yamauchi |
| 2007/0028409 A1 | 2/2007 | Yamada |
| 2007/0079854 A1 | 4/2007 | You |
| 2007/0098329 A1 | 5/2007 | Shimoji et al. |
| 2007/0149062 A1 | 6/2007 | Long et al. |
| 2007/0230874 A1 | 10/2007 | Lin |
| 2007/0232115 A1 | 10/2007 | Burke et al. |
| 2007/0243749 A1 | 10/2007 | Wu |
| 2008/0008430 A1 | 1/2008 | Kewitsch |
| 2008/0044137 A1 | 2/2008 | Luther et al. |
| 2008/0069501 A1 | 3/2008 | Mudd et al. |
| 2008/0101757 A1 | 5/2008 | Lin et al. |
| 2008/0226237 A1 | 9/2008 | O'Riorden et al. |
| 2008/0267566 A1 | 10/2008 | En Lin |
| 2009/0022457 A1 | 1/2009 | De Jong et al. |
| 2009/0028507 A1 | 1/2009 | Jones et al. |
| 2009/0196555 A1 | 8/2009 | Lin et al. |
| 2009/0214162 A1 | 8/2009 | O'Riorden et al. |
| 2009/0220197 A1 | 9/2009 | Gniadek |
| 2010/0034502 A1 | 2/2010 | Lu et al. |
| 2010/0092136 A1 | 4/2010 | Nhep |
| 2010/0247041 A1 | 9/2010 | Szilagyi |
| 2010/0322561 A1 | 12/2010 | Lin et al. |
| 2011/0044588 A1 | 2/2011 | Larson et al. |
| 2011/0131801 A1 | 6/2011 | Nelson et al. |
| 2011/0177710 A1 | 7/2011 | Tobey |
| 2012/0189260 A1 | 7/2012 | Kowalczyk et al. |
| 2012/0269485 A1 | 10/2012 | Haley et al. |
| 2012/0301080 A1 | 11/2012 | Gniadek |
| 2013/0071067 A1 | 3/2013 | Lin |
| 2013/0089995 A1 | 4/2013 | Gniadek et al. |
| 2013/0094816 A1 | 4/2013 | Lin et al. |
| 2013/0121653 A1 | 5/2013 | Shitama et al. |
| 2013/0183012 A1 | 7/2013 | Cabanne Lopez et al. |
| 2014/0016901 A1 | 1/2014 | Lambourn et al. |
| 2014/0023322 A1 | 1/2014 | Gniadek et al. |
| 2014/0050446 A1 | 2/2014 | Chang |
| 2014/0133808 A1 | 5/2014 | Hill et al. |
| 2014/0348477 A1 | 11/2014 | Chang |

FOREIGN PATENT DOCUMENTS

| | | |
|---|---|---|
| CN | 201383588 Y | 1/2010 |
| CN | 2026500189 U | 12/2013 |
| DE | 202006011910 U1 | 3/2007 |
| DE | 102006019335 A1 | 10/2007 |
| EP | 1072915 A2 | 1/2001 |
| EP | 1074868 A1 | 7/2001 |
| EP | 1211537 A2 | 6/2002 |
| EP | 1245980 A2 | 10/2002 |
| EP | 1566674 A1 | 8/2005 |
| GB | 2111240 A | 6/1983 |
| JP | 2009/229545 A | 10/2009 |
| JP | 2009/276493 A | 11/2009 |
| TW | 200821653 A | 5/2008 |
| WO | WO 01/79904 A2 | 10/2001 |
| WO | WO 2004/027485 A1 | 4/2004 |
| WO | WO 2008/112986 A1 | 9/2008 |
| WO | WO 2009/135787 A1 | 11/2009 |
| WO | WO 2010/024851 A2 | 3/2010 |
| WO | WO 2012/136702 A1 | 10/2012 |
| WO | WO 2012/162385 A1 | 11/2012 |
| WO | WO 2013/052070 A1 | 4/2013 |
| WO | WO 2014/028527 A2 | 2/2014 |
| WO | WO 2014/182351 A1 | 11/2014 |

OTHER PUBLICATIONS

European Search Report and Written Opinion dated Feb. 19, 2015 for EP 14168005.

"Fiber Optic Connectors and Assemblies Catalog" 2009, Huber & Suhner Fiber Optics, Herisau, Switzerland, www.google.co.in/

(56) References Cited

OTHER PUBLICATIONS url?sa=t&source=web&cd=63&ved=0CCMQFjACODw&url=http%3A%2F%2Fwww.hubersuhner.com%2Fwrite_rtn_binary.pdf%3Fbinaryid%3D8DBC7DE2EB72D315%26binarytype%3D48403DAA363AEB7E&ei=ZvcvTujWH4ntrAfH-dXZCg&usg=AFQjCNE1MdC-4avewRJU6IDVc_WYbr0QQ.

"Fiber Optic Interconnect Solutions, Tactical Fiber Optic Connectors, Cables and Termini" 2006, Glenair, Inc., Glendale, California, www.mps-electronics.de/fileadmin/files/MPS-E/Produkte/Katalog/Glenair/KatalogGlenair-LWL1110.pdf.

"Fiber Optic Products Catalog" Nov. 2007, Tyco Electronics Corporation, Harrisburg, Pennsylvania, www.ampnetconnect.com/documents/Fiber%20Optics%20Catalog%201107.pdf.

International Search Report and Written Opinion dated Apr. 27, 2012 for PCT/US2011/058799.

International Search Report and Written Opinion dated Aug. 27, 2012 for PCT/US2012/039126.

International Search Report and Written Opinion dated Jan. 16, 2014 for PCT/US2013/54784.

International Search Report and Written Opinion dated Aug. 29, 2014 for PCT/US2014/041500.

International Search Report and Written Opinion dated May 14, 2014 for PCT/US2014/012137.

International Search Report and Written Opinion dated Aug. 21, 2008 for PCT/US2008/057023.

International Preliminary Report on Patentability dated Nov. 19, 2015, from corresponding International Applications No. PCT/US2014/012137, International Filing Date Jan. 17, 2014.

INTERLOCKABLE FIBER OPTIC CONNECTOR ADAPTORS

BACKGROUND

Fiber optic connector adaptors, that may include internal alignment sleeves or surfaces, are frequently utilized to facilitate the mating of one or more fiber optic connectors and the fiber optic cables associated therewith. In this regard, a pair of fiber optic connectors can be inserted into the opposed ends of a fiber optic connector adaptor, and the adaptor serves to align the fiber optic connectors to a degree such that the optical fibers upon which the fiber optic connectors are mounted are appropriately aligned. Fiber optic connector adaptors can be mounted in a patch panel within an enclosure, or the like, so as to align a pair of fiber optic connectors inserted into opposite ends of the fiber optic connector adaptor. A metal or plastic plate or surface in the patch panel may include openings into which the adaptors may be disposed, and the adaptors may be designed to be held in position in the openings with screws or other fasteners.

A variety of fiber optic connector adaptors may be arranged together in a single row or in a single column in such a manner that two abutting surfaces of two or more adjacent adaptors are touching. In other words, the adaptors are arranged in a one dimensional or one directional array. The adaptors may be fixed, or interlocked with one another to form a single interlocked row or column that may be installed as a unit in a corresponding aperture in a patch panel. In this arrangement, however, at least two sides of the adaptors within the row or column are adjoining the metal or plastic panel or bulkhead that is used to hold the adaptors in a stationary and stacked position within the panel. The panel therefore has some minimum distance or space remaining between one single directional row or column of adaptors and another single directional row or column of similar adaptors, or in other words, between adjacent rows or adjacent columns of the adaptors.

With the use of optical fibers increasing at a rapid rate, there is a growing need to increase the number of optical fibers at any given installation. Thus, there remains a need to maximize the density of fiber interconnection sites at an interconnection location.

SUMMARY

The density of fiber interconnection sites may be maximized by configuring the adaptors to be interconnectable with one another from essentially any side, thereby allowing the adaptors to be arranged and interconnected in a two dimensional or two directional array. Each adaptor may thereby interlock with all other adjacent adaptors. With such an embodiment, adjacent rows and columns of adaptors will be abutting, thereby eliminating wasted panel spacing from between adjacent rows or adjacent columns.

In an embodiment a fiber optic adaptor for providing a connection between at least two fiber optic connectors may include at least first and second cavities for receiving fiber optic connectors therein, and connecting members configured for directly interconnecting the adaptor with at least two additional adaptors in both first and second directions of a two-directional array to provide an interconnected two-directional array of adaptors with interconnections in each of the two directions.

In an embodiment, a two-directional array of interconnected fiber optic adaptors for providing connections between fiber optic connectors may include adaptors having connection elements for releasably coupling each adaptor to immediately adjacent adaptors in both directions of the array.

DETAILED DESCRIPTION

Figure 1:
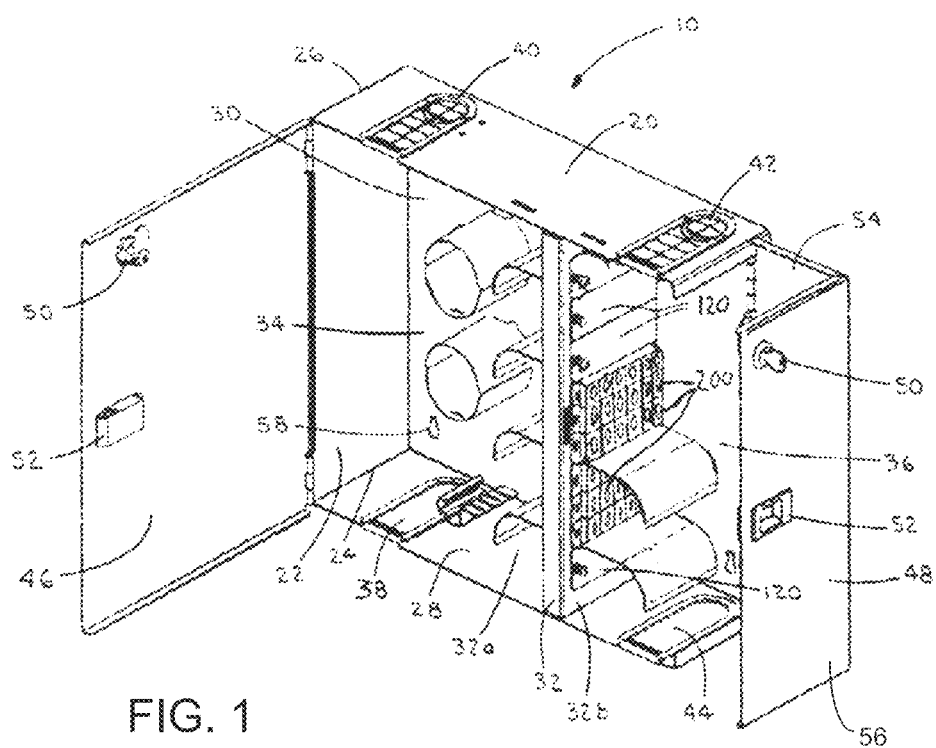
FIGS. 1 and 2 depict a representative panel box for fiber optic cable connections according to an embodiment.
Figure 2:
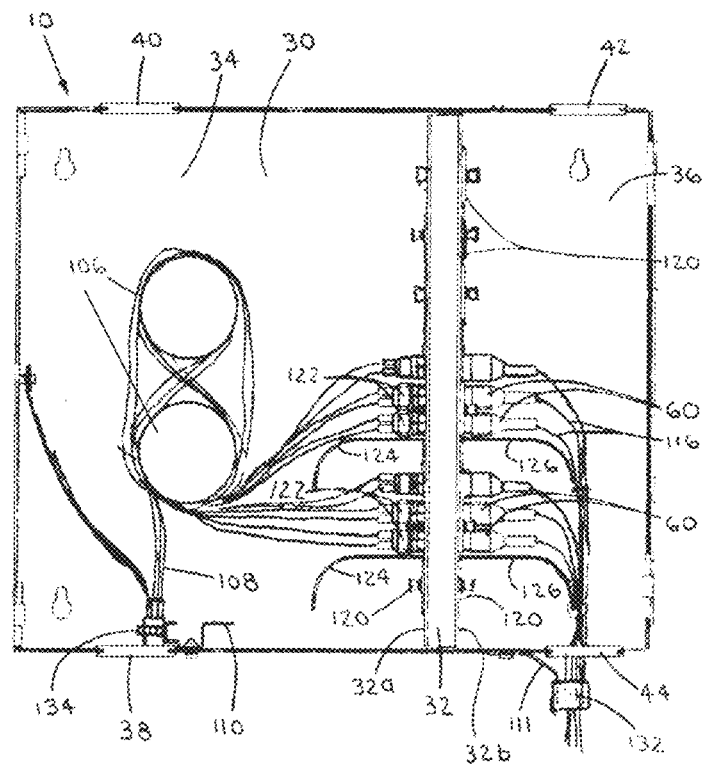

As shown in FIGS. 1 and 2, a fiber optic wall mount cabinet 10 may have a side wall 22 connected at a first end 24 to a bottom wall 28 and at a second end 26 to a top wall 20. A back wall 30 may be substantially perpendicular to edges of the top wall 20, the side wall 22, and the bottom wall 28 so that the side wall, bottom wall, top wall, and back wall form a substantially rectangular enclosure. The back wall 30 may include mounting features, such as key hole mounting slots 58 configured for allowing fastening of the cabinet 10 to a wall surface.

The cabinet may also have a patch panel wall 32 located within the cabinet for connecting fiber optic cable (108, 116 in FIG. 2). Such a patch panel wall 32 may extend between the top wall 20 and the bottom wall 28 and substantially parallel to the side wall 22. The patch panel wall 32 may divide the interior of the cabinet 10 into an incoming chamber 34 and an exiting chamber 36, thereby creating two surfaces, a first incoming surface 32*a* and a second exiting surface 32*b*. The cabinet 10 may have an arrangement of slots 38, 40, 42, 44 in the top wall 20 and the bottom wall 28 to route fiber optic cable into the incoming chamber 34 and out of exiting chamber 36. Incoming fiber optic cables 108 from a cable source may enter the incoming chamber 34 through slot 38 and be terminated on the incoming surface 32*a*. In a like manner, fiber optic cable 116 terminated on exiting surface 32*b* may be routed out of the cabinet 10 through slot 44 to active equipment, such as a server.

The cabinet 10 may also be provided with a pair of slack management spools 106 that allow for spooling bulk incoming cables 108 while maintaining a minimum bend radius in the cables. Further, strain relief brackets 110, 111 may be provided to anchor ties 132, 134 to the cabinet for bundling the fiber optical cable 108, 116 that enters and exits each chamber. Other arrangements of the parts of the cabinet 10, such as the cable slots and patch panel wall are also possible.

The fiber optic wall mount cabinet 10 may also include lockable first cover 46 and second cover 48 to cover the incoming chamber 34 and exiting chamber 36, respectively. The first cover 46 may be hingedly connected to the side wall 22 such that the first cover 46 is perpendicular to the side wall 22 and substantially closes the incoming chamber 34. The second cover 48 may be hingedly connected to the back wall 30, to form a second side wall 54 opposite to the side wall 22 when closed, and an exiting front wall 56 level with a closed first cover 46, when closed. When fully open, the second cover 48 may enable full access to the exiting chamber 36 from both the front and side of the cabinet 10. The first cover 46 and second cover 48 may also include keyed locks 50 and handles 52, located preferably on the outer edges of each cover, for providing security and accessibility, respectively, to the respective chambers 34, 36. In an alternative embodiment, each cover may be hingeless, completely removable, and releasably secured to the cabinet 10 with snaps, clips, or the like. Other arrangements are also possible.

The patch panel wall 32 may include a number of removable covers 120 that cover openings in the wall that provide access between the chambers 34, 36. Upon removal of an appropriate number of plates 120, an array 200 of interlocked connector adaptors 202, 204, 206 (shown in FIG. 3A and described in greater detail below) may be installed on the wall 32. As discussed further below, the surfaces 32a, 32b of the patch panel wall 32 may be configured to accept direct mounting of the adaptor arrays 200. The patch panel wall 32 may be configured along with the adaptor arrays 200 in a variety of orientations. In the representative embodiment of FIGS. 1 and 2, for example, two 3×6 adaptor arrays 200 are shown fastened to the wall 32. FIGS. 4A and 4B depict 3×5 and 3×3 arrays respectively. As will be discussed further below, the connector adaptors may be used in a variety of configurations, for example: as individual connector adaptors; interlocked, multi-member single rows of connector adaptors; interlocked, multi-member single columns of connector adaptors; or multi-row, multi-column arrays of connector adaptors; or any combination thereof.

The fiber optic connector adaptor arrays 200, may serve as termination points for incoming fiber optic cables 108, terminated by connectors 122, and exiting fiber optic cables 116, terminated by connectors 60. To help separate and guide the cables, guide plates 124, 126 may also be provided on the wall 32. While the embodiments in the figures and the discussion below are directed to connector adaptors for MPO type fiber optic connectors, the interlockable connector adaptors may be configured for any type of fiber optic connectors, such as, but not limited to, LC, FC, SC, ST, or MTP types of fiber optic connectors. In addition, each of the adaptors in an array 200 may be configured to accept the same type of connectors, or, individual ones of the adaptors in an array may be configured to individually accept different types of connectors.

The use of fiber optic connector adaptor arrays 200 on the patch panel wall 32 allows for simplified detachment and reattachment of fiber optic cables 108, 116. For example, if a server is to be connected to another cable, only a connection change is required. At the incoming surface 32a, a connector 122 with a first cable may be removed and replaced by a connector 122 of a second cable. Unlike splicing which is a permanent connection, the use of fiber optic cables with connectors, along with the fiber optic connector adaptors of the patch panel wall, may simplify the process of making connection changes.

Figure 3B:
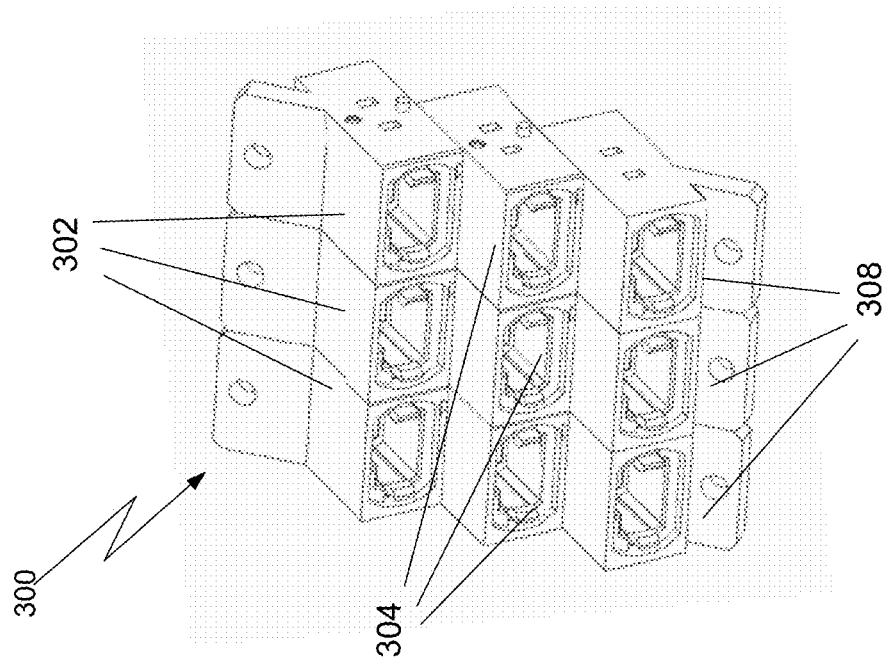
FIGS. 3A and 3B depict representative fiber optic connector adaptor arrays according to an embodiment.
Figure 3A:
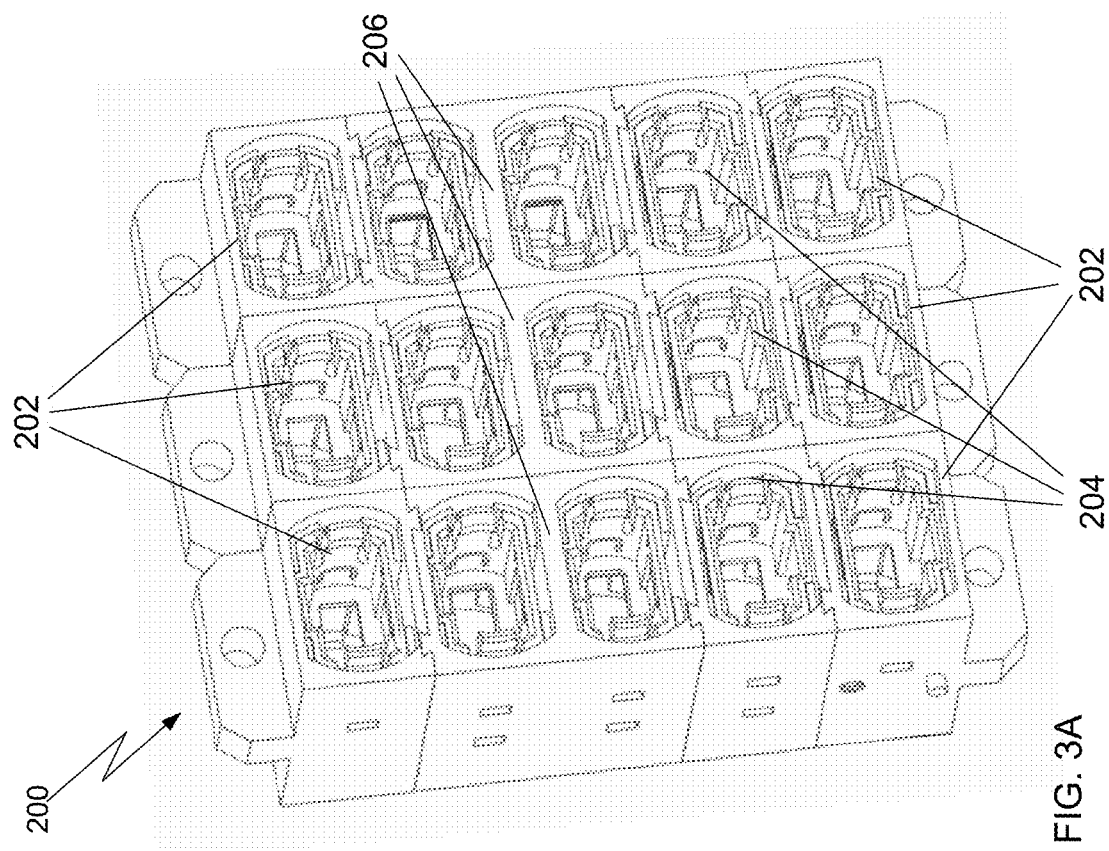
Figure 4A:
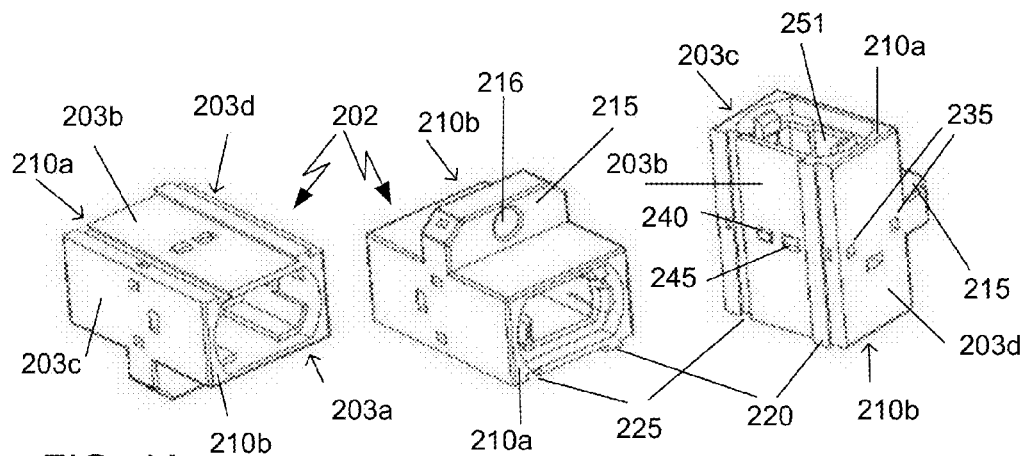
FIGS. 4A-4E show perspective views of 90° adaptors according to embodiments.
Figure 4B:
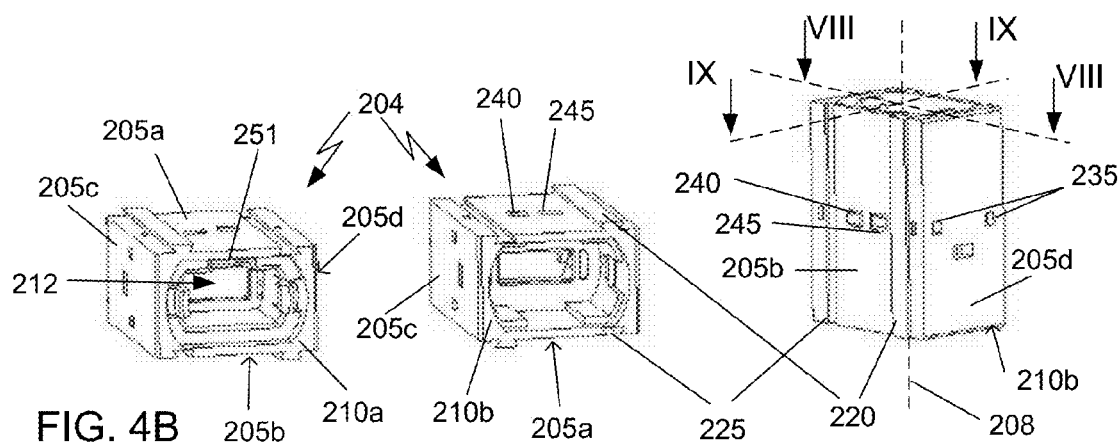

FIG. 3A depicts an embodiment of a 3×5 array 200 of connector adaptors 202, 204, 206 (shown in greater detail in FIGS. 4A-4C), configured for providing a connection orientation of about 90° with respect to a panel wall 32 when attached to the wall. FIG. 3B depicts a 3×3 array 300 of connector adaptors 302, 304, 308 (shown in more detail in FIGS. 5A-5C) configured for providing a connection orientation of about 45° with respect to a panel wall 32 when attached to the wall. The connector adaptors 202, 204, 206, 302, 304, 308, may be configured with essentially any angular configuration to provide essentially any connection orientation angle with respect to the panel wall 32. The angular disposition may be configured as a function of the configuration of the cabinet 10, the location of the cabinet, and/or the accessibility to the inside of the cabinet. As examples, the adaptors may be configured to provide angular connection orientations with respect to a panel wall of about 20°, about 25°, about 30°, about 35°, about 40°, about 45°, about 50°, about 55°, about 60°, about 65°, about 70°, about 75°, about 80°, about 85°, about 90°, or any angle between any of the listed angles.

As shown by the representative embodiments of FIGS. 1-3, the density of fiber interconnection sites may be maximized by configuring the adaptors 200 to be disposed side-by-side in an interconnected two dimensional or two directional array. In this manner, the adaptors will be abutting one another in adjacent rows and adjacent columns, thereby eliminating wasted space from between adjacent rows and adjacent columns, and essentially providing a maximum density of connection adaptors 200 for the available opening space in the patch panel wall.

Figure 4C:
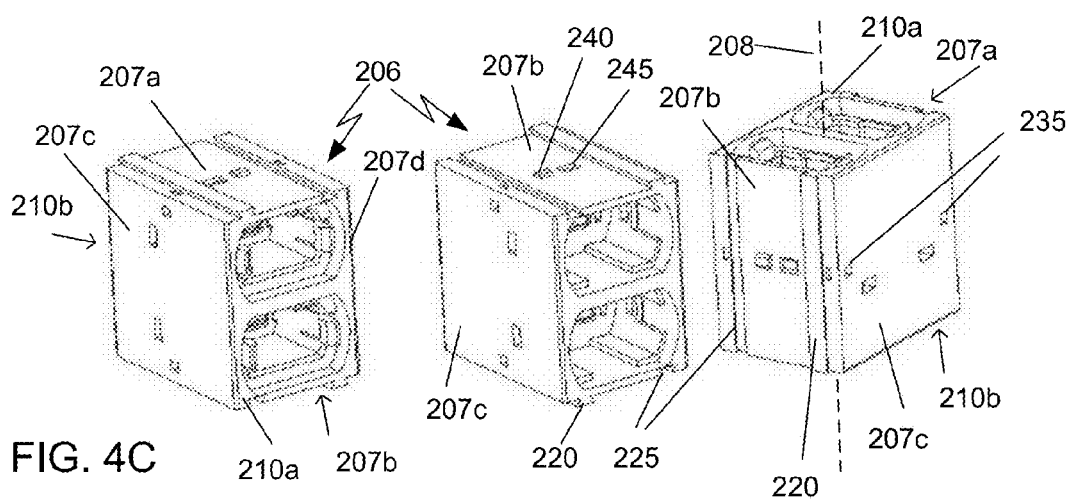

For 90° connection adaptors, there may be at least two types of adaptors as shown in FIGS. 3A and 4A-4C, tabbed adaptors 202 and add-on adaptors 204, 206. Tabbed adaptors 202, as shown in FIG. 4A, may have a rectangular cross-section with a top exterior surface 203a, a bottom exterior surface 203b, and two side exterior surfaces 203c and 203d connecting the top surface to the bottom surface. Top surface 203a may have a tab 215 for attaching the tabbed adaptors to a panel wall 32 (FIGS. 1, 2). In an embodiment, the tab 215 may have an orifice 216 for receipt of a fastener, such as a bolt or screw therethrough to fasten the tab to the panel wall. In addition to the tabbed adaptors 202, adaptors may also be configured as add-on adaptors 204, 206 as shown in FIGS. 4B and 4C, that may be interconnected with the tabbed adaptors 202 or to others of the add-on adaptors. In an embodiment, there may be at least two types of add-on adaptors, single connector adaptors 204 configured to provide a single cable connection, or multiple connector adaptors 206 that may be configured to provide at least two cable connections. In further embodiments, multiple connector adaptors 206 may be configured to provide more than two cable connections, and may be configured to provide three connections, four connections, five connections, six connections, seven connections, eight connections, nine connections, ten connections, or more connections depending on the size of the cabinet 10, the size of the openings into which the connectors fit, and/or the number of connections needed in the cabinet.

In a similar manner as discussed with reference to the add-on adaptors, while not shown, tabbed adaptors 202 may also be configured as multiple connector adaptors for providing at least two cable connections.

Add-on adaptors 204 may have a rectangular cross-section with top exterior surface 205a, a bottom exterior surface 205b, and two side exterior surfaces 205c and 205d connecting the top surface to the bottom surface. Similarly, add-on adaptors 206 may have a rectangular cross-section with top exterior surface 207a, a bottom exterior surface 207b, and two side exterior surfaces 207c and 207d connecting the top surface to the bottom surface.

In an embodiment, the top surface 205a of adaptor 204 may be the same as the top surface 207a of adaptor 206, and the bottom surface 205b of adaptor 204 may be the same as the bottom surface 207b of adaptor 206. In addition, for add-on adaptors 204, 206, the top and bottom surfaces, 205a, 205b and 207a, 207b respectfully, may essentially be symmetrically identical, and the sides may be symmetrically identical, such that upon rotation of the adaptors along a longitudinal axis 208, the tops and bottoms are interchangeable, and the left and right sides are interchangeable.

Figure 4D:
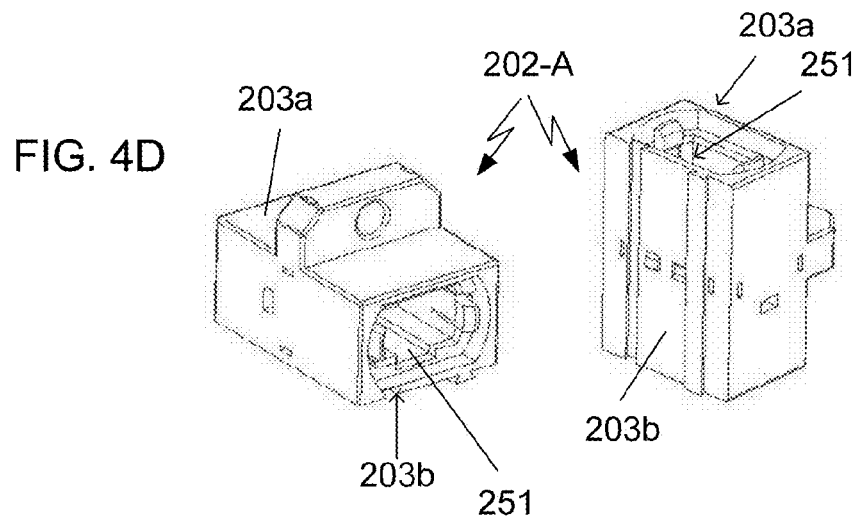
Figure 4E:
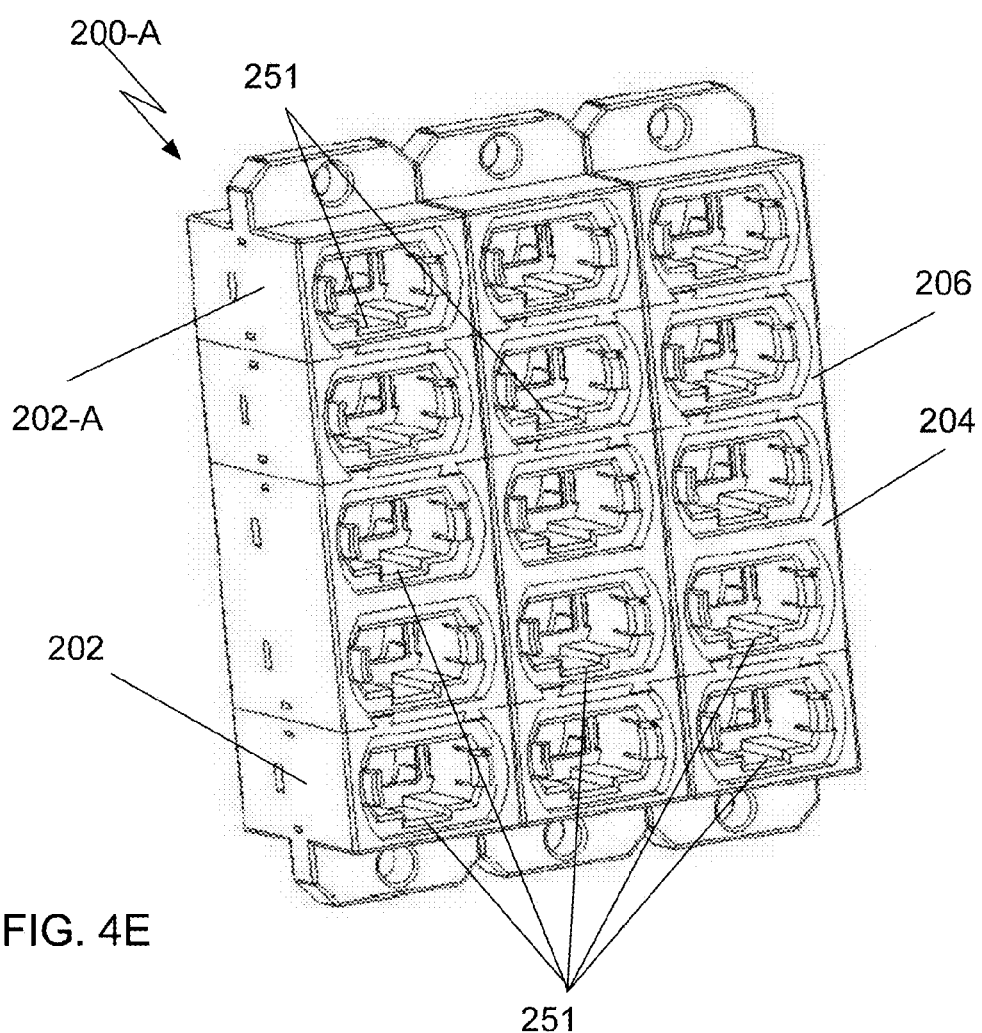

FIGS. 4D and 4E depict an alternative embodiment of an adaptor array 200 in which all of the adaptors are configured and arranged so that key slots 251 (described in greater detail below) within the adaptors are aligned in the same direction. Fiber optic connectors will then only fit into the adaptors in one orientation for all of the adaptors. For such an alignment, the internal configuration of the adaptors may be configured appropriately, so that when interconnected, all of the key slots 251 are arranged appropriately. For example, for the adaptor 202 of FIG. 4A, the key slot 251 is disposed under the surface 203a which has the tab 215. FIG. 4D depicts an alternative tabbed adaptor 202-A where the key slot 251 is disposed on the opposite side, under the surface 203b, so that when arranged in an array as shown in FIG. 4E, the key slots are appropriately aligned. In a similar manner, the internal arrangement of adaptors 204, 206 may also be configured as needed to provide an desired alignment of key slots 251.

To retain the adaptors 202, 204, 206 together in an array 200 as shown in FIG. 3A, the adaptors may be interconnected top-to-bottom to provide an interconnected column of adaptors, interconnected side-to-side to provide interconnected rows of adaptors, or interconnected both top-to-bottom and side-to-side to provide a fully interlocked adaptor array. In an embodiment, the adaptors 202, 204, 206 may be interconnected by means of keyed rails 220 and corresponding keyed channels 225 disposed on the corresponding surfaces to be mated. The adaptors 202, 204, 206 may then be locked together by aligning the rails 220 and channels 225 of one adaptor end-to-end with the rails and channels of another adaptor, and sliding the corresponding rails and channels together along a longitudinal direction (a direction corresponding to axis 208).

While not limited to the following, the rails 220 and channels 225 may have similar cross-sectional configurations (orthogonal to the longitudinal direction) in the shape of an isosceles trapezoid as shown in FIGS. 4A-4C. As such, the portion of the rails 220 disposed outwardly away from the surface may have a width dimension that is larger than the portion disposed adjacent the surface, and in a similar manner the portion of the channels 225 disposed inwardly from the surface may have a width that is greater than the width of the rails at the surface. The rails 220 and channels 225 may have essentially any cross-sectional configuration which provides for an interlocking engagement in orthogonal directions to the sliding longitudinal direction.

While the adaptors 202, 204, 206 depicted in FIGS. 4A-4C have such rails 220 and channels 225 shown on the tops and bottoms 203b, 205a, 205b, 207a, 207b thereof, the adaptors may also have similar rails/channels on the sides 203c, 203d, 205c, 205d, 207c, 207d thereof, so that sliding engagement may interlock the adaptors from top-to-bottom and side-to-side with adjoining adaptors. By providing sliding interlocking engagements in both directions, any one adaptor 202, 204, 206 may individually be removed from an adaptor array 200 without essentially disturbing any of the other adaptors. As an example, for an adaptor array 200 fastened together and installed in a panel 10 (FIG. 1), if it becomes necessary to replace one, or more of the adaptors 202, 204, 206, the adaptors that need to be replaced may be slid out of the array and removed, and a new adaptor or adaptors may be inserted, without disassembly of all of the fiber optic cable connectors 122, 60 and removal of the array from the panel.

Figure 6:
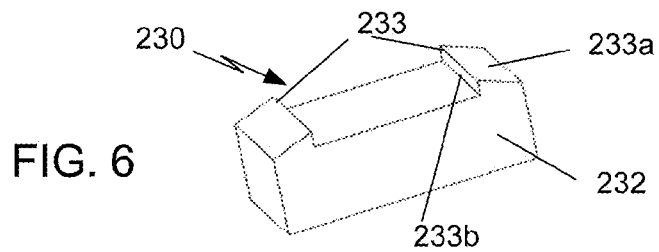
FIG. 6 illustrates a connection clip according to an embodiment.
Figure 7:
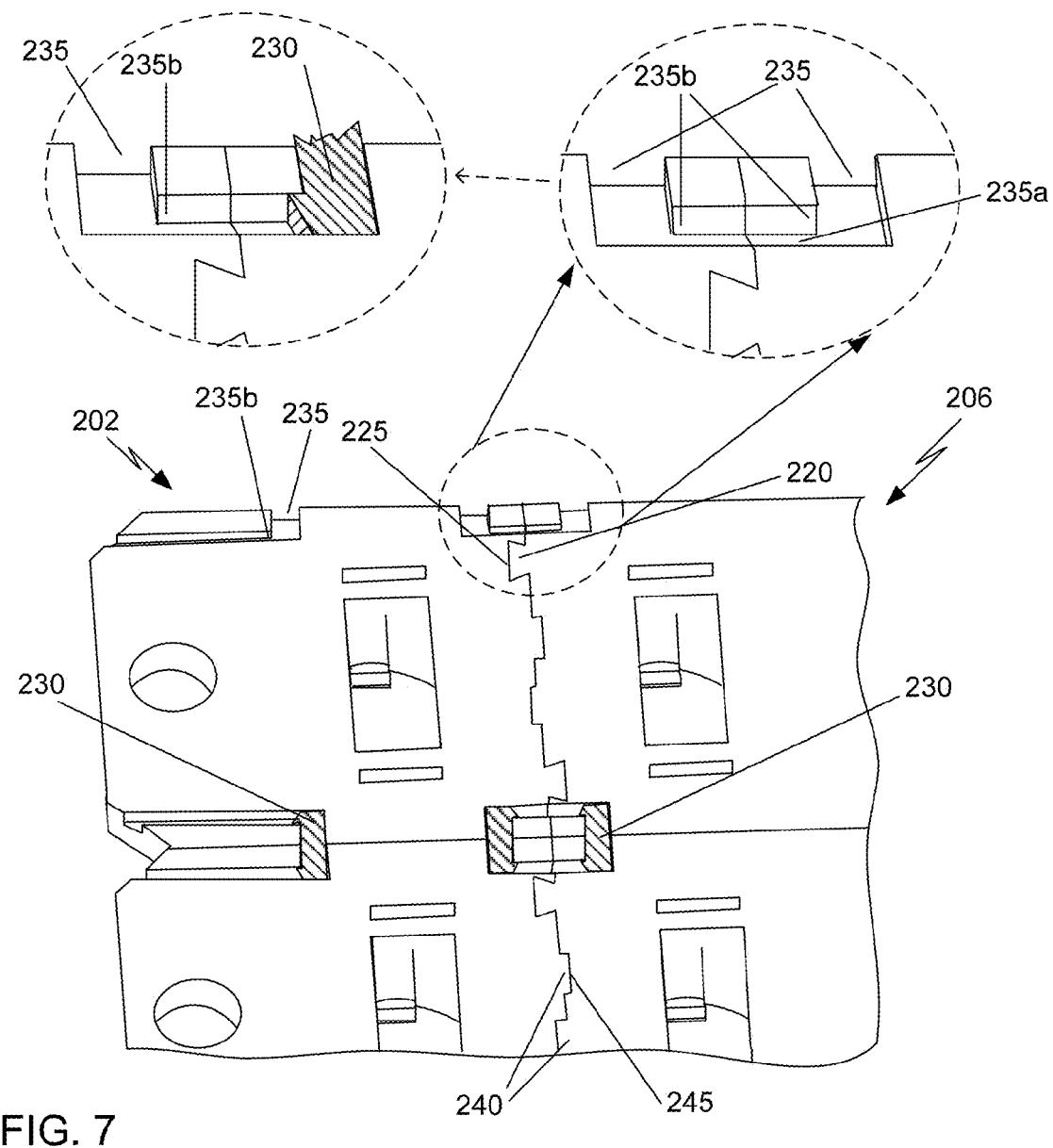
FIG. 7 depicts a cut-away view of adaptors held together via connection clips.

In an alternative embodiment, adaptors 202, 204, 206 may be interlocked with adjoining adaptors by alternative fastening devices. As shown in FIGS. 6 and 7, one type of fastening device may be a clip 230 that may be configured for fastening two adjoining adaptors together. In the embodiment as shown, the sides 203c, 203d, 205c, 205d, 207c, 207d of the adaptors may have coordinating slots 235 for receiving the clip 230 therein. The clips 230 may have a main body portion 232 and clip projections 233 that are configured to engage within the slots 235 and retain the clips within the slots 235. Clip projections 233 may have a beveled surface 233a to provide for an easier insertion of the clips 230 into the slots 235, and an engaging surface 233b that engages with a surface 235b within the slots.

Clips 230 may be constructed of a variety of materials. In an embodiment, the clips 230 may be made of a material which has at least some resiliency so that upon insertion into the slots 235, the projections 233 may deform to fit through the slots, and, upon passage through the slots and into an internal space 235a, return to essentially their original shape to provide an engagement between surface 233b and 235b to retain the clips in the slots. In addition, a resilient material may also allow for the adaptors to be disassembled after one adaptor is interlocked with an adjoining adaptor by means of such a clip 230. By applying a sufficient amount of force in pulling one adjoining adaptor away from another, the clip 230 and projections 233 may be deformed by an amount which allows for an adaptor to disengage from a clip. The resiliency or deformability of a clip 230 may alter the ability of a clip to be removed from a slot 235 once assembled. In instances when it may not be desirable for a clip 270 to be removable, the clip may be made from a rigid material, for example, a metal or a hard plastic. Such a rigid clip may essentially not be removable from an adaptor without significant force and possible damage to an adaptor, while a clip of a softer polymer, for example, a rubber material, may be separated from engagement with an adaptor upon application of an appropriate force, without damage to the adaptor.

In an alternative embodiment, instead of rails 220 and channels 225, as discussed above, the tops and bottoms of the adaptors 203b, 205a, 205b, 207a, 207b may also be configured with slots 235 for interconnection via clips 230.

In an embodiment in which the adaptors 202, 204, 206 are configured for sliding engagement via rails 220 and channels 225, the adaptors may also include a mechanism for ensuring that the adaptors are properly aligned and/or provide resistance to retain the adaptors in a proper alignment. As represented in FIGS. 4A-4C, the adaptors 202, 204, 206 may have a projection 240, on at least one of the top surfaces 205a, 207a and bottom surfaces 203b, 205b, 207b and a corresponding recess 245 on at least the other of the top and bottom surfaces, so that when two adaptors are slid together a projection of one of the adaptors may engage with a recess on the adjoining adaptor to indicate that proper alignment has been attained. As shown in FIGS. 4A-4C, each of the top and bottom surfaces may have both a recess 245 and a projection 240 such that the projection of a first adaptor may fit into the recess of the other adjoining adaptor, and the projection of the other adaptor may fit into the recess of the first adaptor.

Figure 8:
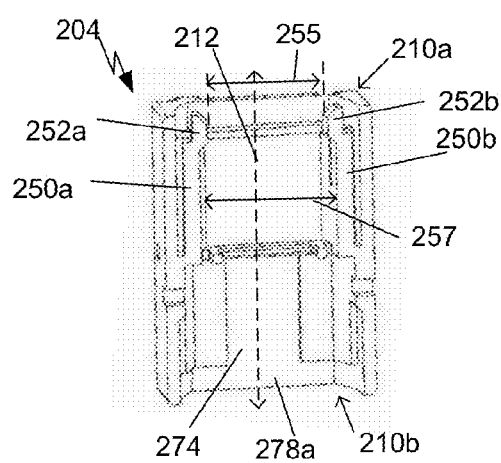
FIGS. 8 and 9 illustrate cross-sectional views of a 90° adaptor of FIG. 4B according to embodiments.
Figure 9:
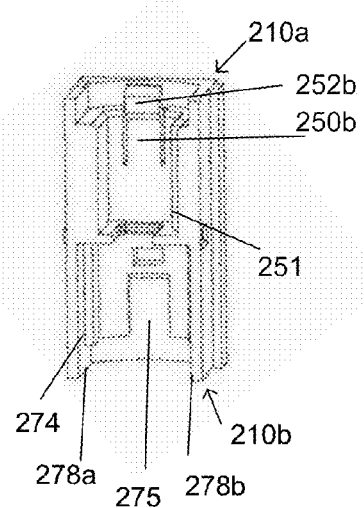

As shown in FIGS. 4A-4C and FIG. 8, adaptors 202, 204, 206 may have a first end 210a and a second end 210b, and may define a longitudinal passage 212 extending from the first end to the second end. FIG. 8 depicts a representative cross-section of an adaptor 204 taken along the section VIII-VIII in FIG. 4B, and FIG. 9 depicts a representative cross-section of an adaptor taken along the section IX-IX in FIG. 4B. As depicted in FIGS. 4A-4C, 8 and 9, in an embodiment, the internal configuration within the adaptors may be different within each of the two ends 210a, 210b. In alternative embodiments, the internal configuration within the adaptors may be the same within each of the two ends 210a, 210b.

In embodiments wherein the internal configurations are the same within each of the two ends 210a, 210b, and if the adaptors 202, 204, 206 are interlocked by means of clips 230 from side-to-side and from top-to-bottom, the adaptors 204, 206 may be configured to be 180° rotationally symmetrical about all three of their major axes. In a similar manner, tabbed adaptors 202 may be configured to be 180° rotationally symmetrical about one of its major axes (a central axis parallel to IX-IX in FIG. 4B) while a 180° rotation about the other two major axes (axis 208 and a central axis parallel to VIII-VIII in FIG. 4B) will result in a tab displacement of 180°, all other features remaining essentially symmetrically the same.

In an embodiment, the first end 210a may be configured for directly receiving a fiber optic connector (not shown for simplicity) therein. In an embodiment, the first end 210a may be keyed with a slot 251 as depicted in FIGS. 4B and 9, to allow a fiber optic connector, having a corresponding tab for the notch, to be inserted into the end 210a in only one alignment. In alternative configurations, if a keyed alignment is not desired or needed, a slot 251 may be provided on each of the opposing sides, or there may be no notches at all on either side to correspond to a non-keyed connector.

The first end 210a may include a retaining arrangement for holding a fiber optic connector within the end once the connector is inserted into the end. In an embodiment as shown, the retaining arrangement may include two oppositely disposed biased retaining arms 250a and 250b. The retaining arms 250a, 250b may be connected at a distal end thereof within the adaptors to allow for a pivoting movement of the arms, and may have projecting tab portions 252a, 252b adjacent the first end 210a. The internal width 255 between the tab portions 252a, 252b may be less than the internal width 257 within the adaptor. A fiber optic connector having a width approximately the same as the width 257 may be inserted into the opening 210a, displacing the tab portions 252a, 252b outwardly away from one another to pass between the retaining arms 250a, 250b. The fiber optic connector may be configured with notches, a groove, or an end, etc., so that when seated within the adaptor, the arms 250a, 250b and tab portions 252a, 252b return to essentially their original location wherein the tab portions may then hold the connector within the adaptor.

In an embodiment (not shown), the internal configuration within the end 210b may be configured in the same manner as the internal configuration within the end 210a as discussed above.

Alternatively, as depicted in FIGS. 4A-4C and 8-10, the internal configuration within the adaptors at the end 210b may differ from that of the first end 210a. Ends 210b of adaptors 202, 204, 206 may be configured for receiving an adaptor latch 270 of a type as depicted in FIGS. 10a and 10b. Latches 270 may be insertable into the ends 210b to convert the ends for receiving and retaining a fiber optic connector therein. The internal cavity within the end 210b may be configured with at least one keying slot 274 to determine the orientation in which the latch 270 will fit into the end. The latch 270 may correspondingly have a keying projection 276 that fits into the keying slot 274 to orient the latch within the opening. The keying projection 276 of the latch 270 may likewise define an internal keyed slot 277 (similar to slot 251 as discussed above) for determining the orientation that a fiber optic connector will fit into the latch. With such a configuration, an array of adaptors 202, 204, 206 may be assembled with an appropriate keyed orientation and if desired fastened into a panel box. Thereafter, a latch 270 may be inserted into the adaptor end 210b in accordance with the keyed orientations. Alternatively, latches 270 may be inserted into the adaptors prior to array assembly.

Figure 10A:
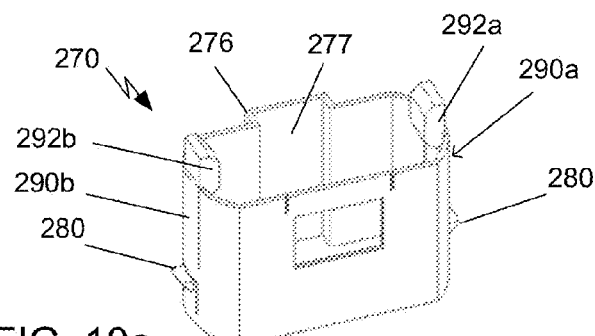
FIGS. 10A and 10B depict adaptor latches for adaptors according to an embodiment.
Figure 10B:
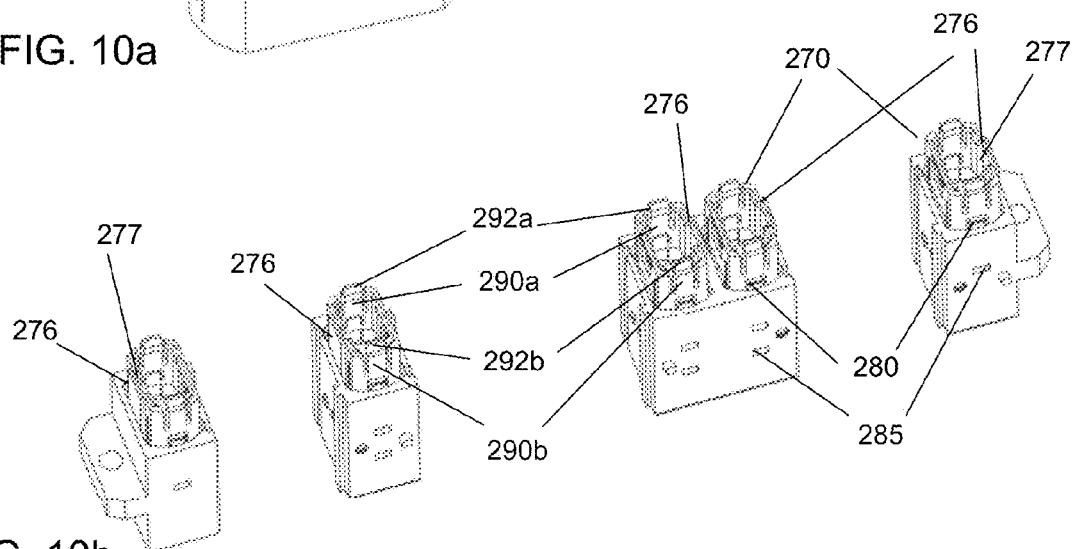

In an embodiment as shown in FIGS. 9 and 10B, each of the opposing faces 278a, 278b within the end 210b may be configured with a keying slot 274 allow a latch 270 to be inserted in either orientation within the adaptors as shown in FIG. 10, wherein the left two latches 270 have keying projections 276 oriented to the left, and right three latches have the keying projections oriented towards the right. With such an embodiment, the adaptors 202, 204, 206 may be assembled into an array 200 and the desired orientation of the latch may be determined at a later time.

Figure 11A:
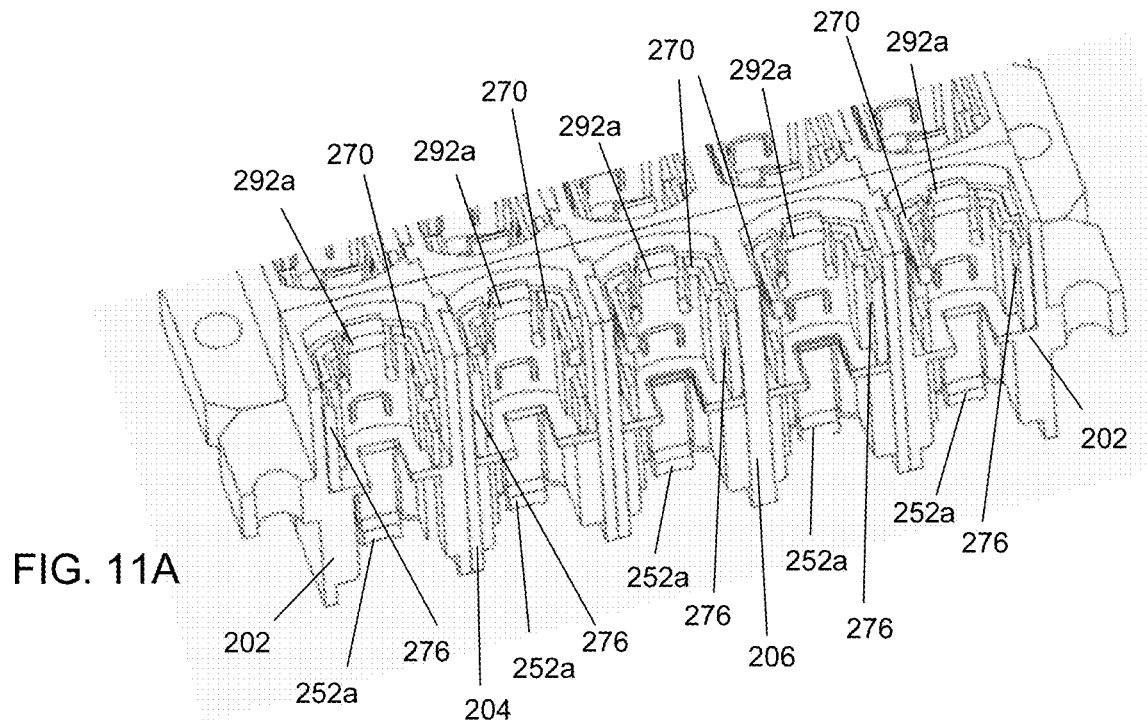
FIGS. 11A and 11B depict cross-sectional views of 90° adaptors and adaptor disposed within the adaptors according to an embodiment.
Figure 11B:
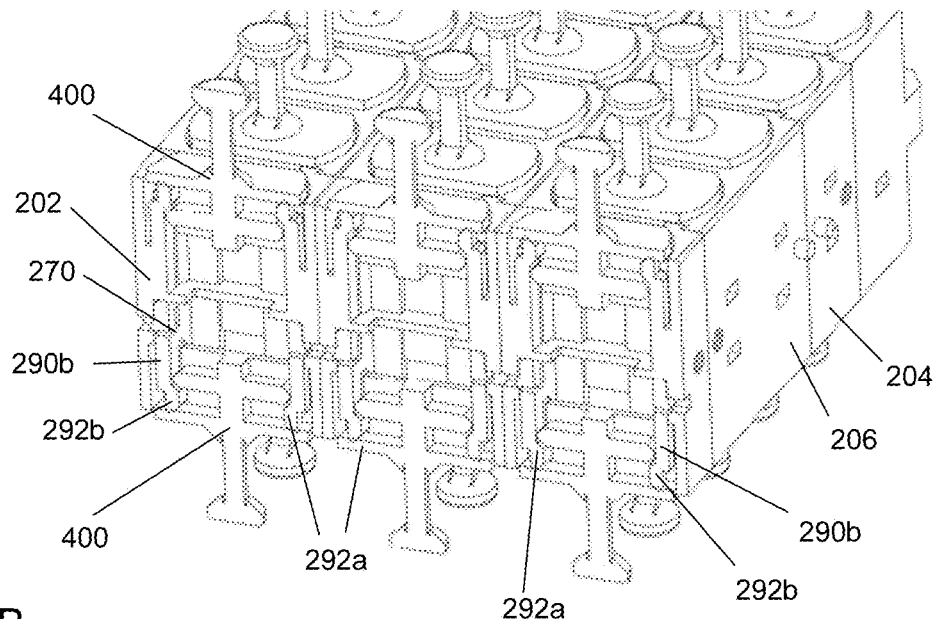

The latch 270 may have displaceable catches 280 that engage in slots 285 of the adaptors to retain the latch within the adaptor. The catches 280 may be displaceable inwardly as the latch 270 is being inserted into the adaptor end, and when the latch is full seated, the catches may be configured to return to essentially their original positions as they pass into slots 285. FIGS. 11A and 11B provide alternative cross-sectional views of latches 270 installed within adaptors 202, 204, 206.

In an embodiment as shown, the latch 270 may include two oppositely disposed biased retaining arms 290a and 290b, similar to the arms 250a and 250b as discussed above. The retaining arms 290a, 290b may be connected at a distal end thereof to the latch, and may have projecting tab portions 292a, 292b adjacent the proximal end of the arms. The internal width between the tab portions 292a, 292b may be less than the internal width within the latch, and a fiber optic connector may be inserted into the opening, displacing the tab portions 292a, 292b outwardly away from one another to pass between the retaining arms 290a, 290b. Adaptor ends 210b may be configure with slots 275 (FIG. 9) to allow arms 290a, 290b to move outwardly when latches 270 are within the adaptors. Tab portions 292a, 292b, upon passage of the connector body portion into the latch, may return to their original position and hold the connector within the latch and adaptor.

In an additional embodiment, the internal configuration within the end 210a may be configured for an adaptor latch 270 in the same manner as the internal configuration within the end 210b as discussed above.

Figure 5A:
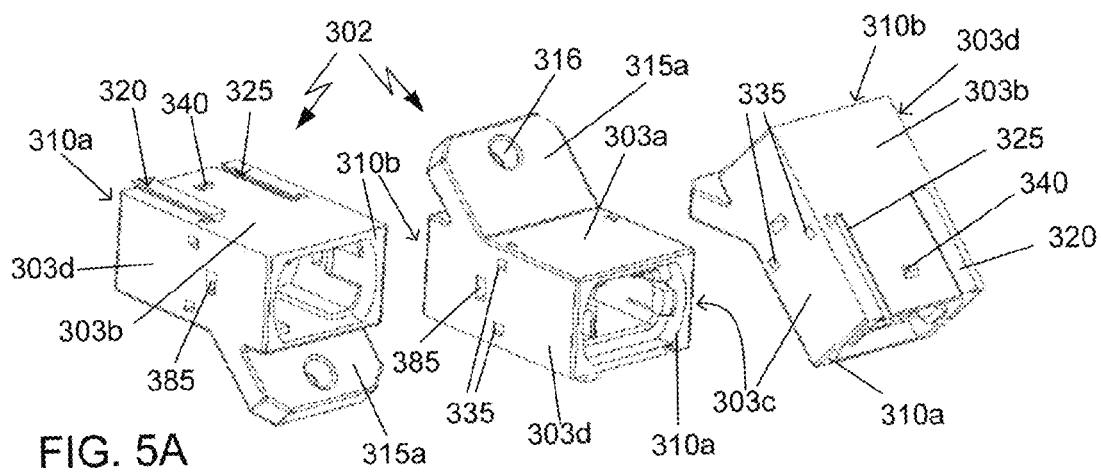
FIGS. 5A-5C show perspective views of 45° adaptors according to embodiments.
Figure 5B:
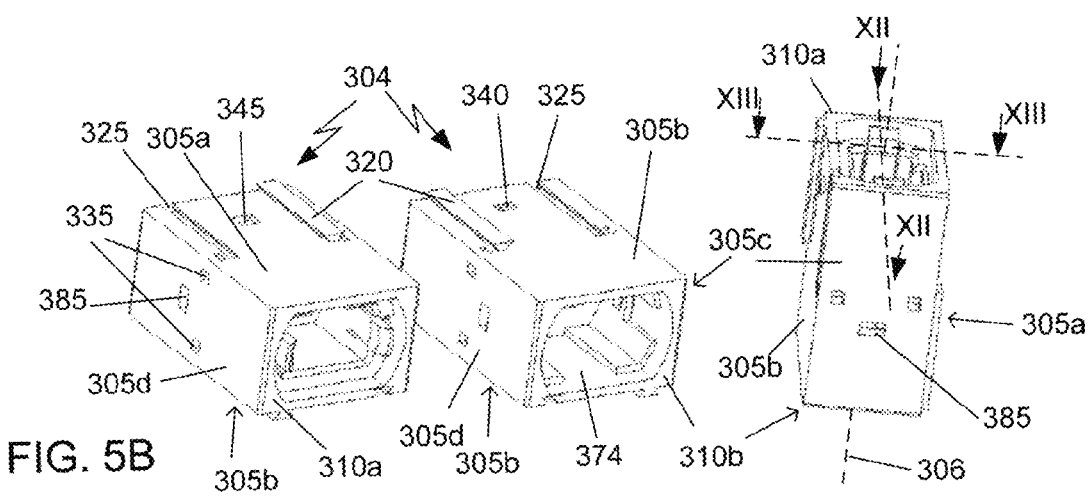
Figure 5C:
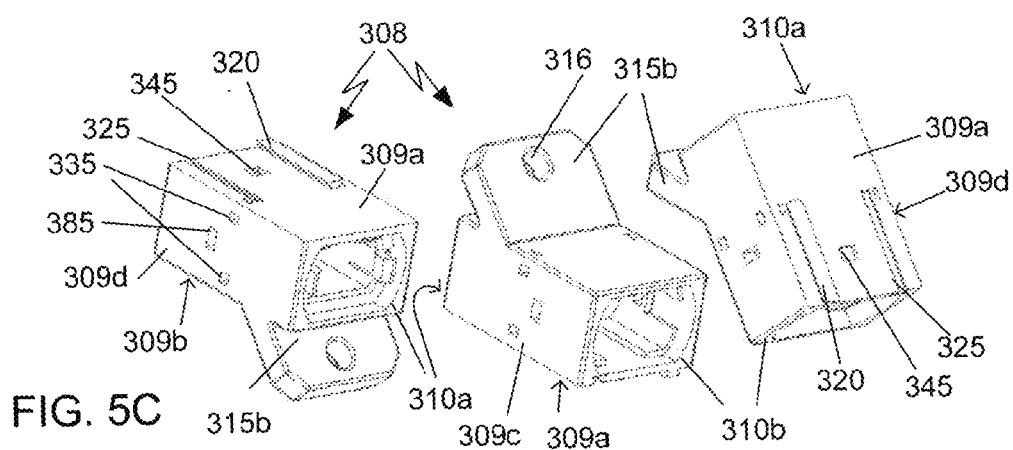

As mentioned earlier with reference to FIG. 3B, the connector adaptors may also be configured to provide an angular orientation of fiber optic cable with respect to a panel wall. FIGS. 5A-5C show an embodiment of angled adaptors 302, 304, 308 configured to provide about a 45° orientation with respect to a panel wall, such as wall 32 of FIGS. 1 and 2. Adaptors 302, 304, 308 may have many similar features to those as discussed above with respect to the 90° adaptors, and therefore, most of the above discussion with regard to the adaptors, latches and configurations thereof, may apply to the angled adaptors as well, with exceptions resulting from the angular positioning of the tab 315.

As shown in FIGS. 3B and 5A-5C, there may be at least three configurations of angled adaptors, first tabbed adaptors 302, add-on adaptors 304, and second tabbed adaptors 308. In alternative embodiments, for example, if the internal configuration at ends 310a, 310b are the same, and if clips 230 and passages 335 are used for interconnecting the adaptors from top-to-bottom and from side-to-side only one type of tabbed angle adaptor may be necessary.

Tabbed adaptors 302, as shown in FIG. 5A, may have a rectangular cross-section with a top exterior surface 303a, a bottom exterior surface 303b, and two side exterior surfaces 303c and 303d connecting the top surface to the bottom surface. Top surface 303a may have an angled tab 315a for attaching the tabbed adaptors to a panel wall 32 (FIGS. 1, 2), wherein the tab is disposed at about a 45° angle with respect to the end 310b or surface 303a. In an embodiment, the tab 315a may have an orifice 316 for receipt of a fastener, such as a bolt or screw therethrough to fasten the tab to the panel wall. Alternatively, other types of fastening arrangements may also be used.

Tabbed adaptors 308, as shown in FIG. 5C, may have a rectangular cross-section with a top exterior surface 309a, a bottom exterior surface 309b, and two side exterior surfaces 309c and 309d connecting the top surface to the bottom surface. Bottom surface 309b may have a tab 315b for attaching the tabbed adaptors to a panel wall 32 (FIGS. 1, 2), wherein the tab is disposed at a 45° angle with respect to the end 310a. In an embodiment, the tab 315b may have an orifice 316 for receipt of a fastener, such as a bolt or screw therethrough to fasten the tab to the panel wall.

In addition to the tabbed angled adaptors 302, 308, angled adaptors may also be configured as add-on adaptors 304 as shown in FIG. 5B, that may be interconnected with the tabbed adaptors 302, 308 or to others of the add-on adaptors. While only a single connector add-on adaptor 304 configured to provide a single cable connection is shown, multiple connector adaptors may be configured (in a manner as presented above with respect to adaptor 206) to provide at least two cable connections. In further embodiments, multiple connector adaptors may also be configured to provide more than two cable connections, and may be configured to provide three connections, four connections, five connections, six connections, seven connections, eight connections, nine connections, ten connections, or more connections depending on the size of the cabinet 10, the size of the openings into which the connectors fit, and/or the number of connections needed in the cabinet.

Add-on adaptors 304 may have a rectangular cross-section with top exterior surface 305a, a bottom exterior surface 305b, and two side exterior surfaces 305c and 305d connecting the top surface to the bottom surface.

To retain the adaptors 302, 304, 308 together, the adaptors may be interconnected top-to-bottom to provide an interconnected column of adaptors, interconnected side-to-side to provide interconnected rows of adaptors, or interconnected both top-to-bottom and side-to-side to provide a fully interlocked adaptor array. In an embodiment, the adaptors 302, 304, 308 may be interconnected by means of keyed rails 320 and corresponding keyed channels 325 disposed on the corresponding surfaces to be mated. The adaptors 302, 304, 308 may then be locked together by aligning the rails 320 and channels 325 of one adaptor end-to-end with the rails and channels of another adaptor, and sliding the corresponding rails and channels together along a longitudinal direction (a direction corresponding to axis 306).

While not limited to the following, the rails 320 and channels 325 may have similar cross-sectional configurations (orthogonal to the longitudinal direction) in the shape of an isosceles trapezoid as shown in FIGS. 5A-5C. As such, the portion of the rails 320 disposed outwardly away from the surface may have a width dimension that is larger than the portion disposed adjacent the surface, and in a similar manner the portion of the channels 325 disposed inwardly from the surface may have a width that is greater than the width of the rails at the surface. The rails 320 and channels 325 may have essentially any cross-sectional configuration which provides for an interlocking engagement in orthogonal directions to the sliding longitudinal direction.

While the adaptors 302, 304, 308 depicted in FIGS. 5A-5C have such rails 320 and channels 325 shown on the tops and bottoms 303b, 305a, 305b, 309a thereof, the adaptors may also have similar rails/channels on the sides 303c, 303d, 305c, 305d, 309c, 309d thereof, so that sliding engagement may interlock the adaptors from top-to-bottom and side-to-side with adjoining adaptors. By providing sliding interlocking engagements in both directions, any one adaptor 302, 304, 308 may individually be removed from an adaptor array 300 without essentially disturbing any of the other adaptors. As an example, for an adaptor array 300 fastened together and installed in a panel 10 (FIG. 1), if it becomes necessary to replace one, or more of the adaptors 302, 304, 308, the adaptors that need to be replaced may be slid out of the array and removed, and a new adaptor or adaptors may be inserted, without disassembly of all of the fiber optic cable connectors 122, 60 and removal of the array from the panel.

As shown in FIG. 3B, the adaptors 302, 304, 308 overly each other by about one-half of their length. Therefore, as depicted in FIGS. 3B and 5A-5C, the rails 320 and channels 325 may extend along only one-half of the length. However, full length rails 320 and channels 325 may also be provided, as such may provide for full sliding engagement, especially for adaptors having a sliding interlocking engagement on all sides, as described above.

In an alternative embodiment, adaptors 302, 304, 308 may be interlocked with adjoining adaptors by alternative fastening devices, such clip 230 described above. In the embodiment as shown, the sides 303c, 303d, 305c, 305d, 309c, 309d of the adaptors may have coordinating slots 335 (essentially the same as slots 235 described above) for receiving the clip 230 therein.

In an alternative embodiment, instead of rails 220 and channels 225, as discussed above, the tops and bottoms of the adaptors 303b, 305a, 305b, 309a may also be configured with slots for interconnection via clips 230.

In an embodiment in which the adaptors 302, 304, 308 are configured for sliding engagement via rails 320 and channels 325, the adaptors may also include a mechanism for ensuring that the adaptors are properly aligned and/or provide resistance to retain the adaptors in a proper alignment. For this purpose, projections and recesses may be configured in a manner as described above for the 90° adaptors (240 and 245 in FIGS. 4A-4C). Alternatively, as represented in FIGS. 5A-5C, the adaptors 302, 304, 308 may have at least a projection 340, on one of the top surface or the bottom surface, and a corresponding recess on at least the other of the top or bottom surfaces. In FIGS. 5A-5C, surfaces 303b and 305b have a projection 340, while surfaces 305a and 309a have a recess 345, and such could be interchanged, with surfaces 303b and 305b having a recess, while surfaces 305a and 309a have a projection.

Figure 12:
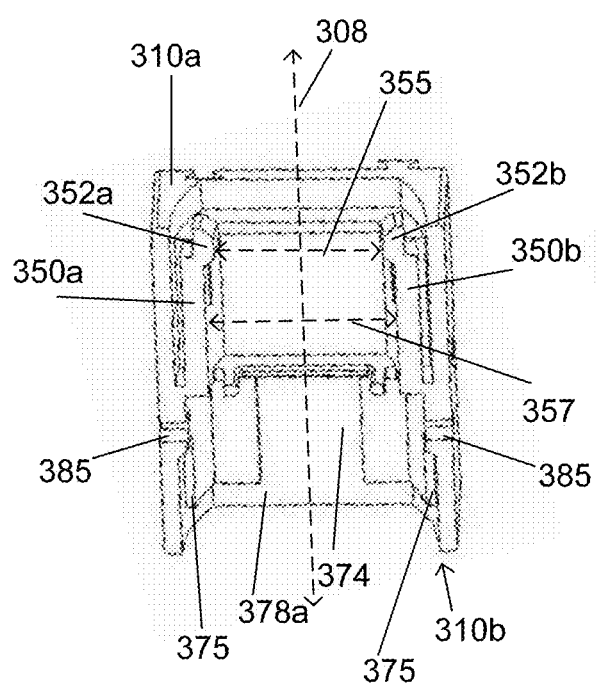
FIGS. 12 and 13 illustrate cross-sectional views of a 45° adaptor of FIG. 5B according to embodiments.
Figure 13:
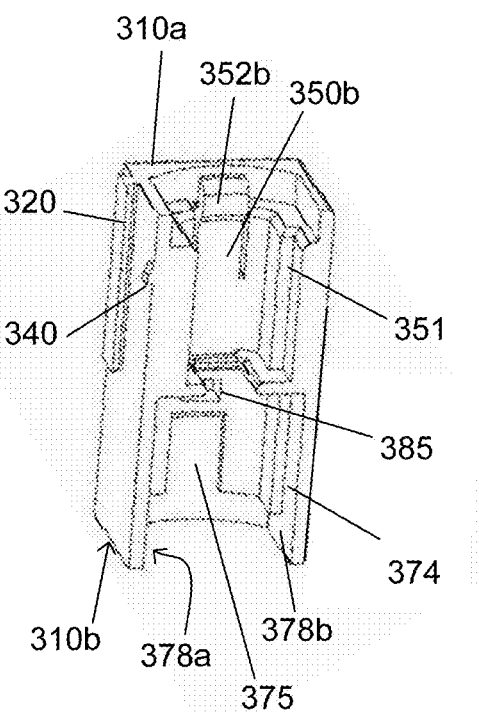

Adaptors 302, 304, 308 may have a first end 310a and a second end 310b and may define a longitudinal passage 312 extending from the first end to the second end. FIG. 12 depicts a representative cross-section of an adaptor 304 taken along the section XII-XII in FIG. 5B, and FIG. 13 depicts a representative cross-section of an adaptor taken along the section XIII-XIII in FIG. 5B. As depicted in FIGS. 5A-5C, 12 and 13, in an embodiment, the internal configuration within the adaptors may be different within each of the two ends 310a, 310b.

In alternative embodiments, the internal configuration within the adaptors may be the same within each of the two ends 310a, 310b.

In embodiments wherein the internal configurations are the same within each of the two ends 310a, 310b, and if the adaptors 302, 304, 308 are interlocked by means of clips 230 from side-to-side and from top-to-bottom, the adaptors 304 may be configured to be 180° rotationally symmetrical about all three of their major axes. In a similar manner, tabbed adaptors 302 and 308 may be interchangeable as discussed above.

In an embodiment, the first end 310a may be configured for directly receiving a fiber optic connector (not shown for simplicity) therein. In an embodiment, the first end 310a may be keyed with a slot 351 as depicted in FIG. 13, to allow a fiber optic connector, having a corresponding tab for the notch, to be inserted into the end 310a in only one alignment. In alternative configurations, if a keyed alignment is not desired or needed, a slot 351 may be provided on each of the opposing sides, or there may be no notches at all on either side to correspond to a non-keyed connector.

The first end 310a may include a retaining arrangement for holding a fiber optic connector within the end once the connector is inserted into the end. In an embodiment as shown, the retaining arrangement may include two oppositely disposed biased retaining arms 350a and 350b. The retaining arms 350a, 350b may be connected at a distal end thereof within the adaptors to allow for a pivoting movement of the arms, and may have projecting tab portions 352a, 352b adjacent the first end 310a. The internal width 355 between the tab portions 352a, 352b may be less than the internal width 357 within the adaptor. A fiber optic connector having a width approximately the same as the width 357 may be inserted into the opening 310a, displacing the tab portions 352a, 352b outwardly away from one another to pass between the retaining arms 350a, 350b. The fiber optic connector may be configured with notches, a groove, or an end, etc., so that when seated within the adaptor, the arms 350a, 350b and tab portions 352a, 352b return to essentially their original location wherein the tab portions may then hold the connector within the adaptor.

In an embodiment (not shown), the internal configuration within the end 310b may be configured in the same manner as the internal configuration within the end 310a as discussed above.

Alternatively, as depicted in FIGS. 5A-5C, 12 and 13, the internal configuration within the adaptors at the end 310b may differ from that of the first end 310a. Ends 310b of adaptors 302, 304, 308 may be configured for receiving the adaptor latch 270 (FIG. 10A) described above. The internal cavity within the end 310b may be configured with slots 385 to retain the latch 270 within the adaptor via the catches 280. The internal cavity within the end 310b may be configured with at least one keying slot 374 (shown in additional detail in FIG. 5B) to determine the orientation in which the latch 270 will fit into the end. The latch 270 may correspondingly have a keying projection 276 that fits into the keying slot 374 to orient the latch within the opening. The keying projection 276 of the latch 270 may likewise define an internal keyed slot 277 (similar to slot 351 as discussed above) for determining the orientation that a fiber optic connector will fit into the latch. With such a configuration, an array of adaptors 302, 304, 308 may be assembled with an appropriate keyed orientation and if desired fastened into a panel box. Thereafter, a latch 270 may be inserted into the adaptor end 310b in accordance with the keyed orientations. Alternatively, latches 270 may be inserted into the adaptors prior to array assembly.

Figure 14A:
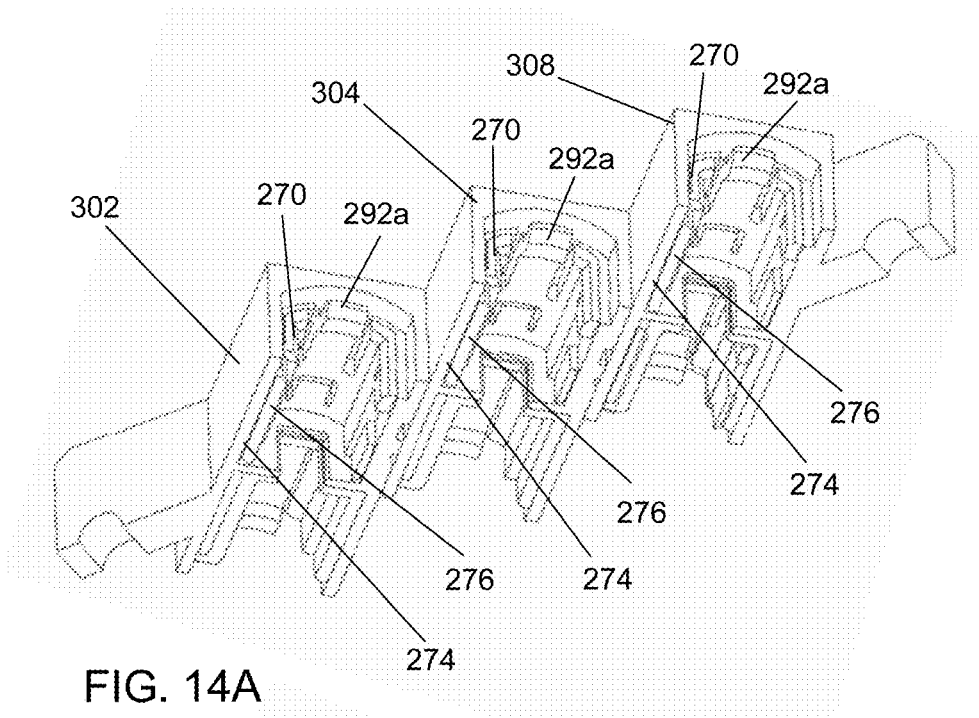
FIGS. 14A and 14B depict cross-sectional views of 45° adaptors and adaptor disposed within the adaptors according to an embodiment.
Figure 14B:
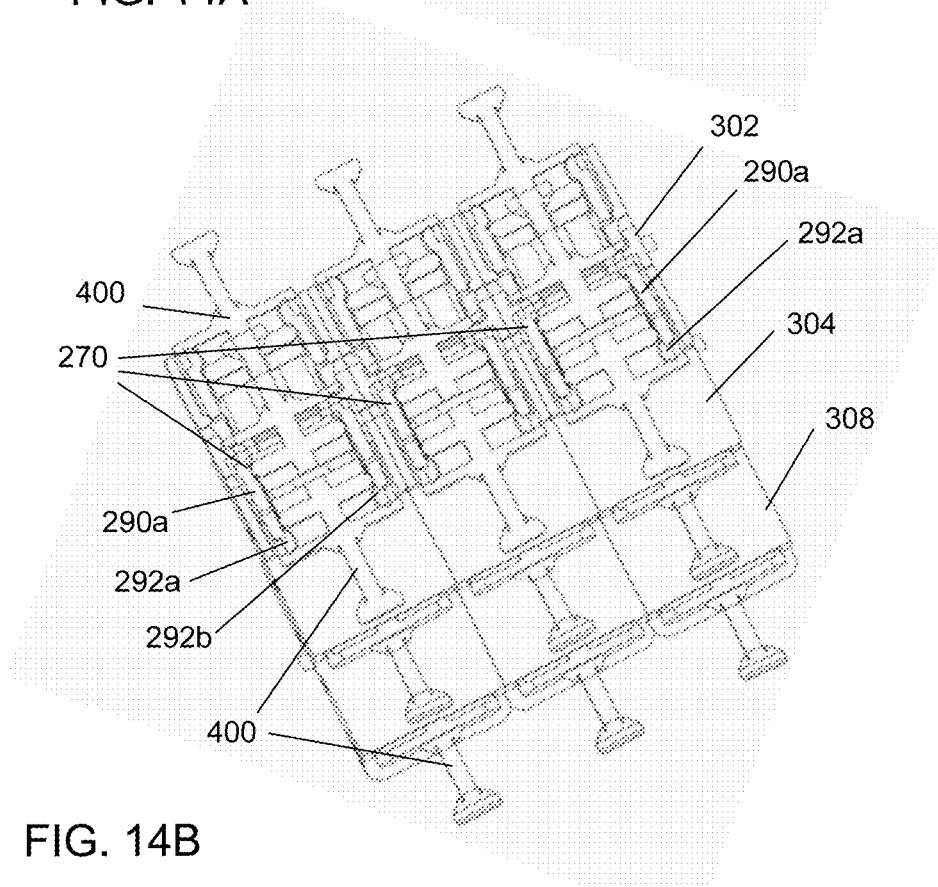

In an embodiment as shown in FIG. 13, each of the opposing faces 378a, 378b within the end 310b may be configured with a keying slot 374 allow a latch 270 to be inserted in either orientation within the adaptors (similar to that as shown in FIG. 10b, wherein the left two latches 270 have keying projections 276 oriented to the left, and right three latches have the keying projections oriented towards the right). With such an embodiment, the adaptors 302, 304, 308 may be assembled into an array 300 and the desired orientation of the latch may be determined at a later time. FIGS. 14A and 14B provide alternative cross-sectional views of latches 270 installed within adaptors 302, 304, 308. Adaptor ends 310b may be configured with slots 375 (FIGS. 12, 13) to allow arms 290a, 290b of the latches 270 to move outwardly when latches are within the adaptors.

In an additional embodiment, the internal configuration within the end 310a may be configured for an adaptor latch 270 in the same manner as the internal configuration within the end 310b as discussed above.

As shown in FIGS. 11B and 14B, a plug cap may be provided that also fits within the ends of the adaptors. In the depicted embodiments, when the ends are configured for direct receipt of a connector therein (ends 210a, 310a in FIGS. 4A-4C, 5A-5C) a dust cap 400 may fit directly into the ends and may be held in place within the opening via the arms 250a, 250b, 350a, 350b and the projections 252a, 252b, 352a, 352b that may engage in a recess of the cap. In addition, when the ends are configured to receive the latches 270 therein (ends 210b, 310b in FIGS. 4A-4C, 5A-5C) the dust caps 400 may be configured to fit within the latches 270 to be held in place within the ends 210b, 310b via the arms 290a, 290b and the projections 292a, 292b that may engage in a recess of the cap. As shown in FIGS. 11B and 14B, one configuration of dust caps 400 may fit into both types of ends.

This disclosure is not limited to the particular systems, devices and methods described, as these may vary. The terminology used in the description is for the purpose of describing the particular versions or embodiments only, and is not intended to limit the scope.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A fiber optic adaptor for providing a connection between at least two fiber optic connectors, the adaptor comprising:
   at least first and second cavities for receiving fiber optic connectors therein; and
   connecting members configured for directly interconnecting the adaptor with at least two additional adaptors in both first and second directions of a two-directional array to provide an interconnected two-directional array of adaptors with interconnections in each of the two directions;
   wherein the adaptor has a first end comprising the first cavity, a second end comprising the second cavity and disposed opposite the first end, and defines a first longitudinal bore between the first and second ends, the first longitudinal bore defining a longitudinal axis;
   the adaptor defines an exterior surface disposed about the longitudinal bore, and the exterior surface defines at least a first pair of oppositely disposed sides defining a first direction orthogonal to the longitudinal axis, and a second pair of oppositely disposed sides defining a second direction orthogonal to both the longitudinal axis and the first orthogonal direction; and
   at least one side of each pair of opposite sides is configured for being disposed adjacent and abutting a side of an additional interconnected adaptor;

the adaptor is a rectangular cuboid having a length extending from the first end to the second end;
the first pair of oppositely disposed sides comprises a first side and a second side defining a height therebetween;
the second pair of oppositely disposed sides comprises a third side and a fourth side defining a width therebetween;
at least one of the first side and the second side is configured for being disposed adjacent to and interconnected with one of a first side and a second side of an additional interconnected adaptor; and
at least one of the third side and the fourth side is configured for being disposed adjacent to and interconnected with one of a third side and a fourth side of an adjacent interconnected adaptor;
the connecting members are disposed on the at least one of the first side and the second side and on the at least one of the third side and the fourth side;
the connecting members comprise at least one of:
 a slot in the external surface of the adaptor extending in a longitudinal direction of the adaptor; and
 a projecting rail extending from the external surface of the adaptor and extending in a longitudinal direction of the adaptor;
the at least one of the slot and the projecting rail is configured to interlock via a longitudinal sliding engagement with a corresponding other of:
 a projecting rail extending from an external surface of an additional adaptor, and
 a slot in an external surface of an additional adaptor; and
the at least one of the first side and the second side and the at least one of the third side and the fourth side comprises a stop for aligning adaptors during sliding engagement;
the adaptor comprises at least one additional longitudinal bore disposed in longitudinal alignment with the first longitudinal bore and aligned with the first longitudinal bore in the first orthogonal direction, each at least one additional longitudinal bore comprises an additional set of first and second cavities for receiving and aligning fiber optic connectors therein; and
the first orthogonal direction defines a first orthogonal axis to the longitudinal axis, the second orthogonal direction defines a second orthogonal axis to the longitudinal axis, and the adaptor has 180° rotational symmetry about the longitudinal axis, the first orthogonal axis, the second orthogonal axis, or any combination thereof;
wherein the adaptor is one of a tabbed adaptor for being fastened to a panel assembly and an add-on adaptor configured for being attached to at least one of a tabbed adaptor and an additional add-on adaptor, wherein:
a tabbed adaptor comprises:
 a tab extending from the first side and configured for being fastened to a panel assembly; and
 at least one connecting member disposed on each of the second, third and fourth sides,
wherein the second side of the tabbed adaptor is configured to be interconnected with each of:
 a first side and a second side of an add-on adaptor, and
 a second side of an additional tabbed adaptor, and
the third and fourth sides of the tabbed adaptor are configured to be connected to each of:
 a third side and a fourth side of an additional tabbed adaptor, and
 a third side and a fourth side of an add-on adaptor; and
an add-on adaptor comprises at least one connecting member disposed on each of the first, second, third and fourth sides, wherein the first and second sides of the add-on adaptor are configured to be interconnected with each of:
 a first side and a second side of an additional add-on adaptor, and
 a second side of a tabbed adaptor, and
the third and fourth sides of the add-on adaptor are configured to be interconnected with each of:
 a third side and a fourth side of an additional add-on adaptor, and
 a third side and a fourth side of a tabbed adaptor.

2. The adaptor of claim 1, wherein:
the at least one connecting member of each of the second side of the tabbed adaptor, and the first side and the second side of the add-on adaptor comprises a longitudinal rail spaced a first distance from one of the third side and the fourth side, and a longitudinal slot spaced a second distance from the other of the third side and the fourth side, wherein the first distance is the same as the second distance;
each of the longitudinal rail and the longitudinal slot has cross-sectional configuration corresponding to the cross-sectional configuration of the other of the longitudinal rail and the longitudinal slot; and
each longitudinal rail and longitudinal slot of the adaptor is configured to slidingly engage with a corresponding other of a longitudinal slot and longitudinal rail of an additional adaptor for interlocking the adaptors.

3. The adaptor of claim 2, wherein the at least one connecting member of each of the third side and the fourth side of the tabbed adaptor and each of the third side and the fourth side of the add-on adaptor comprises at least one clip configured for interlocking a tabbed adaptor or an add-on adaptor with an additional tabbed adaptor or add-on adaptor.

4. The adaptor of claim 3, wherein:
the clip has a first end and a second end, and a longitudinal dimension extending from the first end to the second end;
each of the third side and the fourth side of a tabbed adaptor and each of the third side and the fourth side of an add-on adaptor comprises at least one clip slot configured for receiving one of the first end and the second end of the clip therein, and the at least one clip slot is positioned for being aligned with a clip slot of the third side or the fourth side of another tabbed adaptor or a clip slot of the third side or the fourth side of another add-on adaptor;
each at least one clip slot defines an internal surface, and at least one of:
 the internal surface within the clip slot, and
 the first and second ends of the clip,
comprises a projection, and at least the other of:
 the internal surface within the clip slot, and
 the first and second ends of the clip,
comprises a recess for receiving the projection therein for retaining the clip in the clip slot.

5. The adaptor of claim 4, wherein:
the adaptor is configured for being disposed in a panel;
the panel defines a planar surface; and
the adaptor is configured for being disposed in the panel with the longitudinal direction thereof at an angle of about 30 degrees to 90 degrees to the planar surface.

6. The adaptor of claim 5, wherein each of the first and second cavities comprises an internally keyed configuration configured for one of:
 directly receiving a fiber optic connector therein in a first orientation; and directly receiving an adaptor latch therein in each of a first orientation or a second orientation rotated 180° from the first orientation, wherein the adaptor latch further comprises an internally keyed configuration for directly receiving a fiber optic connector therein in a first orientation.

7. The adaptor of claim 6, wherein:
each of the first and second cavities is independently configured for one of:
   directly receiving a fiber optic connector therein, and comprises opposed retaining arms configured for releasably retaining a fiber optic connector within the cavity, the retaining arms being resiliently displaceable outwardly for passage of a fiber optic connector therebetween; and
   directly receiving an adaptor latch therein, and one of the adaptor latch and the cavity comprises at least one of a first recess and a first resiliently displaceable projection, and the other of the adaptor latch and the cavity comprises a corresponding other of a resiliently displaceable projection and a recess for engaging with the at least one of the first recess and first resiliently displaceable projection to releasably retain the adaptor latch within the cavity, and the adaptor latch comprises opposed retaining arms configured for releasably retaining a fiber optic connector within the cavity, the retaining arms being resiliently displaceable outwardly for passage of a fiber optic connector therebetween.

8. A two-directional array of interconnected fiber optic adaptors for providing connections between fiber optic connectors, the adaptors comprising connection elements for releasably coupling each adaptor to immediately adjacent adaptors in both directions of the array, wherein:
   each adaptor comprises:
      at least first and second cavities for receiving fiber optic connectors therein;
      an exterior surface disposed about the cavities; and
      the connection elements are configured for directly interconnecting each adaptor with the immediately adjacent adaptors with the exterior surface of each adaptor abutting an exterior surface of each immediately adjacent adaptor in both directions of the array;
   each adaptor has a first end comprising the first cavity, a second end comprising the second cavity and disposed opposite the first end, and defines a longitudinal bore between the first and second ends, the longitudinal bore defining a longitudinal axis;
   the exterior surface defines:
      first and second oppositely disposed sides defining a first orthogonal direction orthogonal to the longitudinal axis and defining a height therebetween;
      third and fourth oppositely disposed sides defining a second orthogonal direction orthogonal to both the longitudinal axis and the first orthogonal direction and defining a width therebetween;, and
      at least one side of each pair of opposite sides is configured for being disposed adjacent and abutting a side of immediately adjacent adaptors;
   each adaptor is one of a tabbed adaptor for being fastened to a panel assembly and an add-on adaptor configured for being attached to at least one of a tabbed adaptor and an additional add-on adaptor, wherein:
   each tabbed adaptor comprises:
      a tab extending from the first side and configured for being fastened to a panel assembly; and
      at least one connecting element disposed on each of the second, third and fourth sides,
   wherein the second side of each tabbed adaptor is configured to be interconnected with each of:
      a first side and a second side of an add-on adaptor, and
      a second side of an additional tabbed adaptor, and
   the third and fourth sides of each tabbed adaptor are configured to be connected to each of:
      a third side and a fourth side of an additional tabbed adaptor, and
      a third side and a fourth side of an add-on adaptor; and
   each add-on adaptor comprises at least one connecting element disposed on each of the first, second, third and fourth sides, wherein the first and second sides of each add-on adaptor are configured to be interconnected with each of:
      a first side and a second side of an additional add-on adaptor, and
      a second side of a tabbed adaptor, and
   the third and fourth sides of each add-on adaptor are configured to be interconnected with each of:
      a third side and a fourth side of an additional add-on adaptor, and
      a third side and a fourth side of a tabbed adaptor;
   the at least one connecting element of each of the second side of the tabbed adaptors, and the first side and the second side of the add-on adaptors comprises a longitudinal rail spaced a first distance from one of the third side and the fourth side, and a longitudinal slot spaced a second distance from the other of the third side and the fourth side, wherein the first distance is the same as the second distance;
   each of the longitudinal rails and the longitudinal slots has a cross-sectional configuration corresponding to the cross-sectional configuration of the others of the longitudinal rails and the longitudinal slots; and
   each longitudinal rail and longitudinal slot is configured to slidingly engage with a corresponding other of the longitudinal slots and longitudinal rails of another adaptor for interlocking the adaptors;
   the at least one connecting element of each of the third side and the fourth side of the tabbed adaptors and each of the third side and the fourth side of the add-on adaptors comprises at least one clip configured for interlocking the tabbed adaptors or the add-on adaptors with an additional tabbed adaptor or add-on adaptor;
   the clip has a first end and a second end, and a longitudinal dimension extending from the first end to the second end;
   each of the third side and the fourth side of the tabbed adaptors and each of the third side and the fourth side of the add-on adaptors comprises at least one clip slot configured for receiving one of the first end and the second end of the clip therein, and the at least one clip slot is positioned for being aligned with the clip slot of the third side or the fourth side of another tabbed adaptor or the clip slot of the third side or the fourth side of another add-on adaptor;
   each at least one clip slot defines an internal surface, and at least one of:
      the internal surface within the clip slot, and
      the first and second ends of the clip,
   comprises a projection, and at least the other of:
      the internal surface within the clip slot, and
      the first and second ends of the clip,
   comprises a recess for receiving the projection therein for retaining the clip in the clip slot.

* * * * *

UNITED STATES PATENT AND TRADEMARK OFFICE
CERTIFICATE OF CORRECTION

PATENT NO. : 9,268,103 B2  
APPLICATION NO. : 13/891191  
DATED : February 23, 2016  
INVENTOR(S) : Anh Ngoc Nguyen et al.

Page 1 of 1

It is certified that error appears in the above-identified patent and that said Letters Patent is hereby corrected as shown below:

On the Title page:

Item [73] Assignee: Senko Advanced Components, Inc., Marlborough, MA (US)

should read:

Assignees: Senko Advanced Components, Inc., Marlborough, MA (US); Amphenol Fiber Optic Technology (Shenzhen) Co., Ltd., Schenzhen (CN)

Signed and Sealed this
Nineteenth Day of July, 2016

Michelle K. Lee
*Director of the United States Patent and Trademark Office*